United States Patent
Bagley et al.

(10) Patent No.: US 11,592,567 B1
(45) Date of Patent: Feb. 28, 2023

(54) REAL-TIME AUTOMATED YARD AUDIT

(71) Applicant: Amazon Technologies, Inc., Seattle, WA (US)

(72) Inventors: Gregory Bagley, Vashon, WA (US); Vijay Kumar Bage, Sammamish, WA (US); Ethan Joseph Elmenhurst, Redmond, WA (US); Maneesh Janyavula, Seattle, WA (US); Sam Vincent Beckmann, Bellevue, WA (US); Ruben Flores Diazchavez, Chandler, AZ (US); Navjot Singh, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 716 days.

(21) Appl. No.: 16/582,502

(22) Filed: Sep. 25, 2019

(51) Int. Cl.
| | |
|---|---|
| G01S 17/89 | (2020.01) |
| G06T 17/05 | (2011.01) |
| G06Q 10/0639 | (2023.01) |
| G06T 7/521 | (2017.01) |

(52) U.S. Cl.
CPC .......... *G01S 17/89* (2013.01); *G06Q 10/0639* (2013.01); *G06T 7/521* (2017.01); *G06T 17/05* (2013.01); *G06T 2207/10028* (2013.01)

(58) Field of Classification Search
CPC ..... G01S 17/89; G06Q 10/0639; G06T 7/521; G06T 17/05; G06T 2207/10028
See application file for complete search history.

(56) References Cited

U.S. PATENT DOCUMENTS

| | | | |
|---|---|---|---|
| 8,009,864 B2 * | 8/2011 | Linaker | G06V 20/10 382/103 |
| 8,321,303 B1 * | 11/2012 | Krishnamurthy | G06Q 30/02 705/28 |
| 9,348,022 B1 * | 5/2016 | Tomcsak | G01S 13/347 |
| 9,996,818 B1 * | 6/2018 | Ren | G06V 20/52 |
| 2015/0052029 A1 * | 2/2015 | Wu | G06Q 10/087 705/28 |

\* cited by examiner

*Primary Examiner* — Said Broome
(74) *Attorney, Agent, or Firm* — Patterson + Sheridan, LLP

(57) ABSTRACT

An automated yard audit system is provided. The automated yard audit system includes one or more light detection and ranging (LIDAR) sensors, which are each configured to scan at least a portion of a fulfillment yard, and a controller. The controller is configured to receive scanning data of the yard from each of the LIDAR sensors and generate a virtual representation of the fulfillment yard based on the scanning data. The controller is also configured to identify one or more objects in the fulfillment yard, track movement of the one or more objects in the fulfillment yard, perform an audit of the fulfillment yard, and determine capacity information of the fulfillment yard, based on the virtual representation.

20 Claims, 16 Drawing Sheets

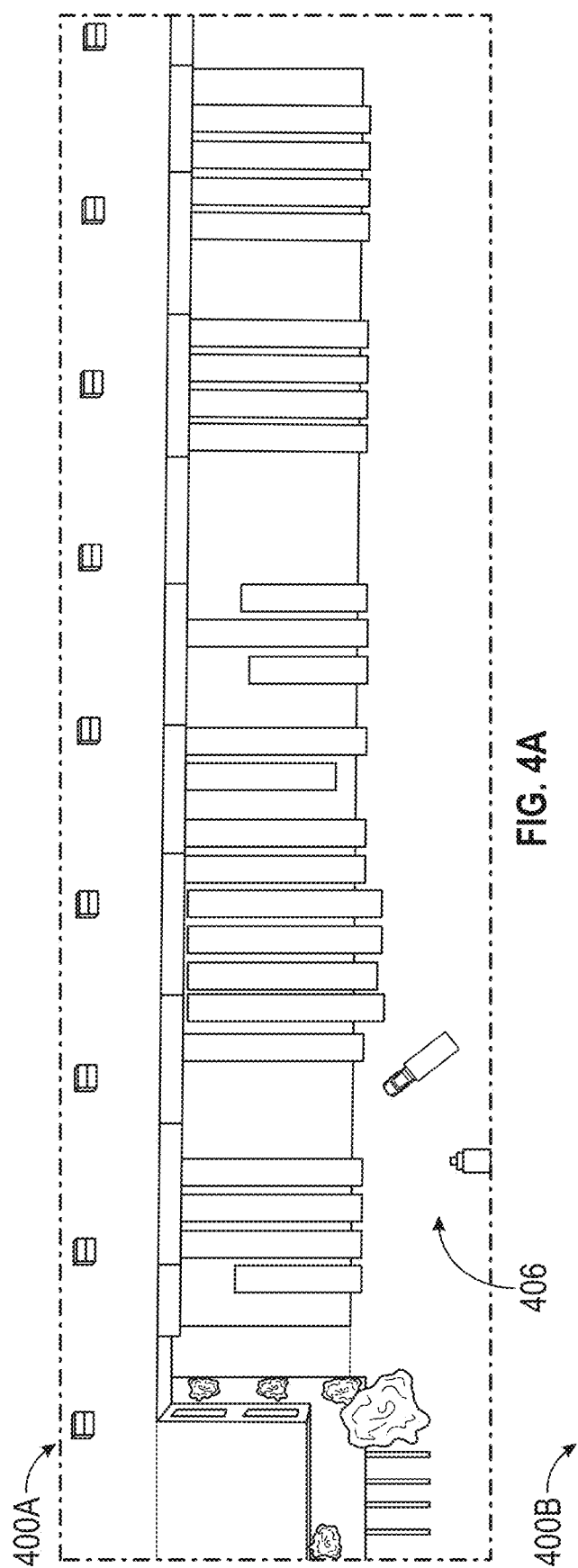
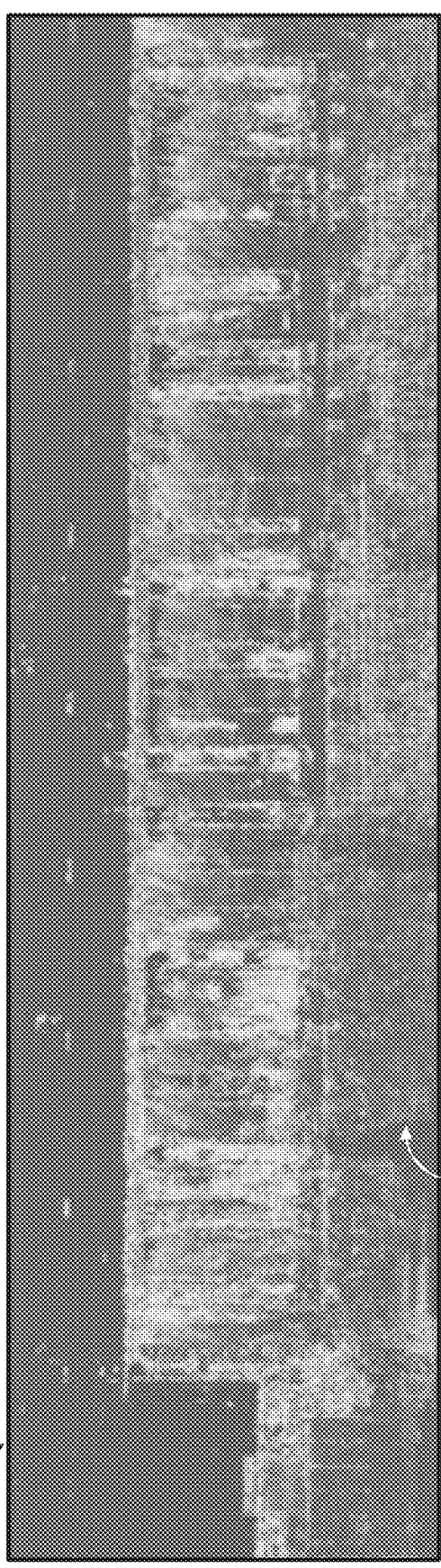
FIG. 4A
FIG. 4B

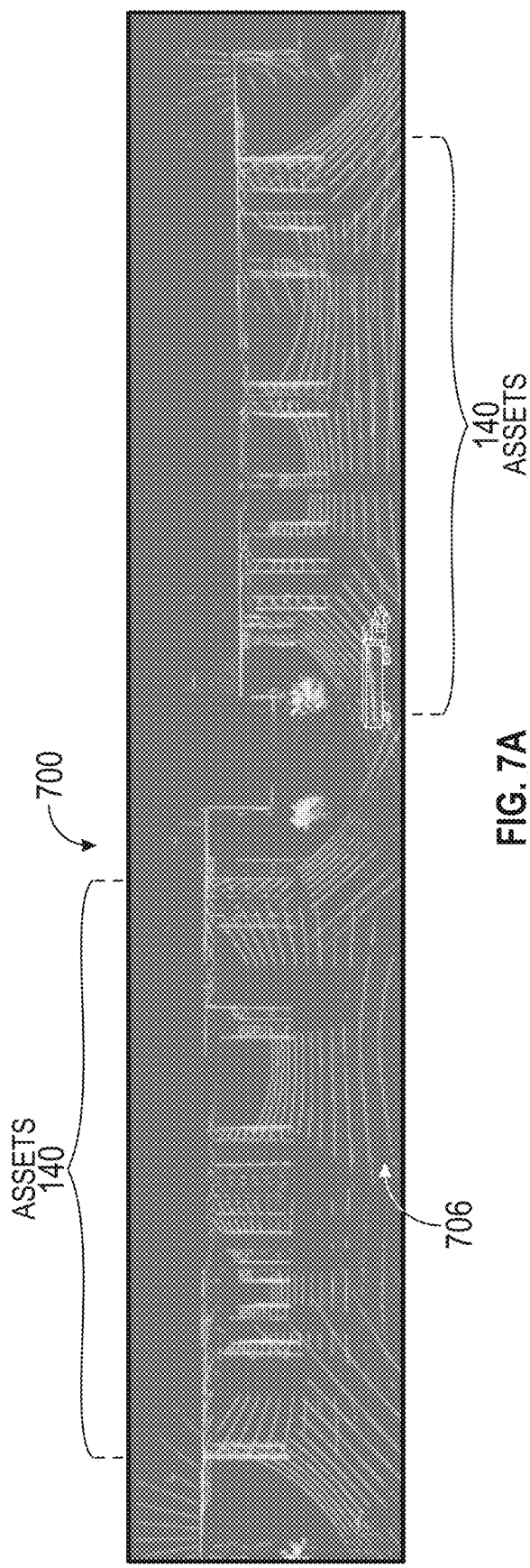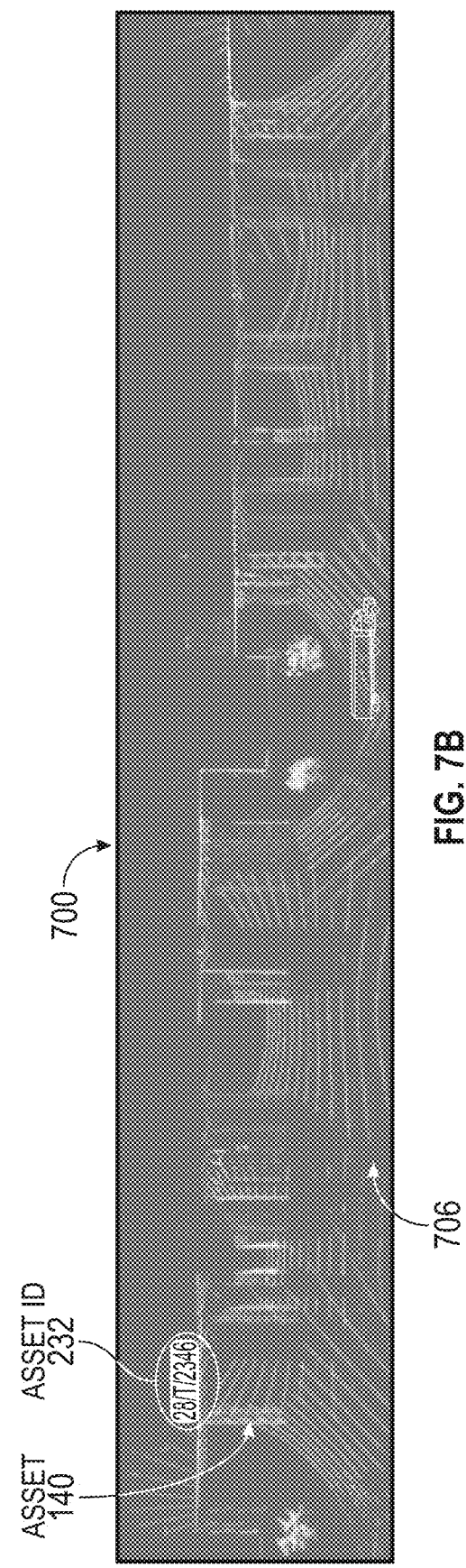

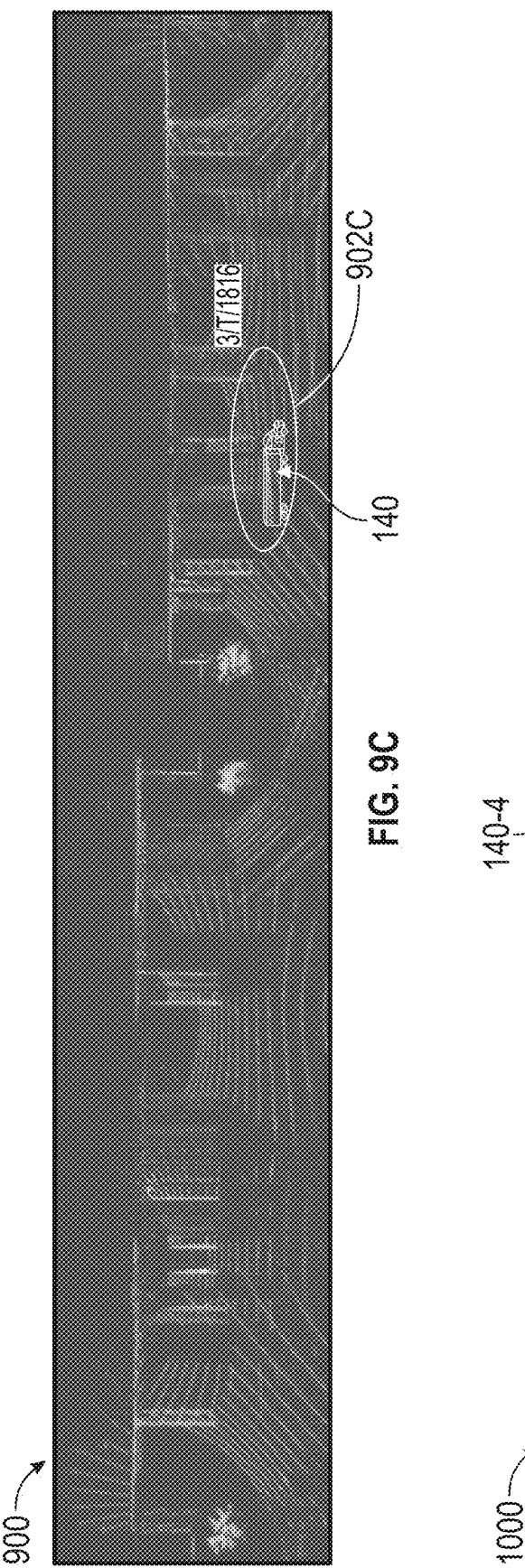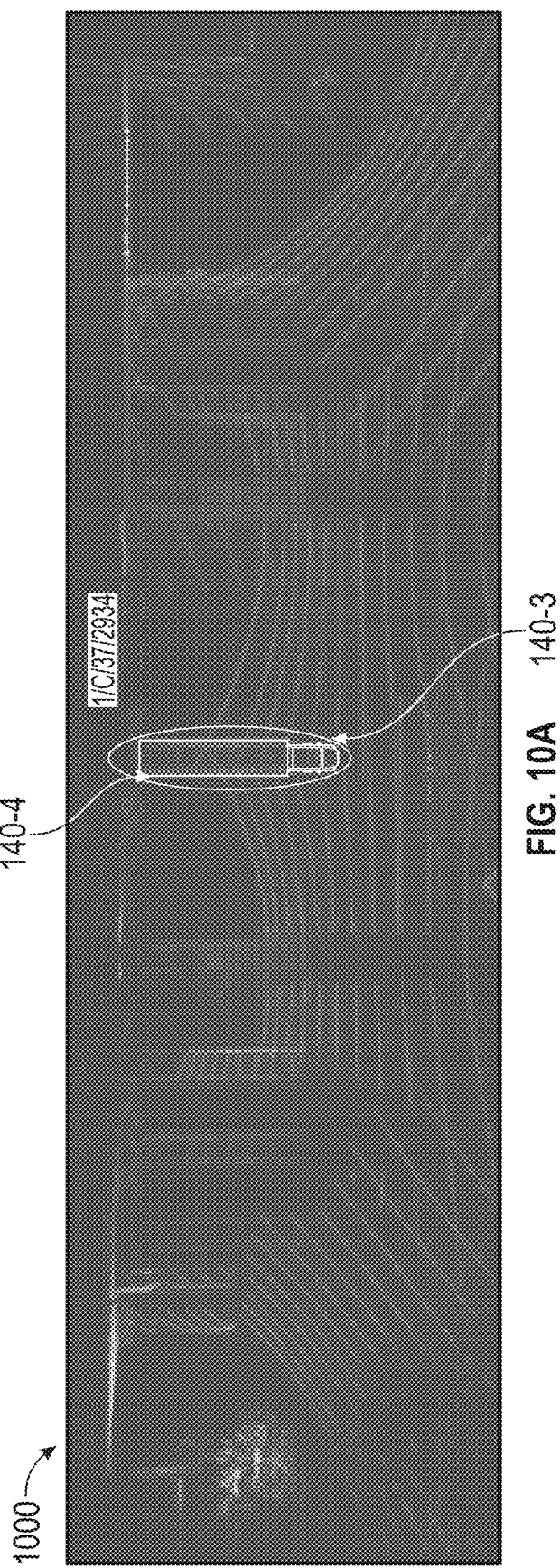

| TOTAL SLIPS | 169 |
|---|---|
| ☑ MATCHES | 115 |
| ☑ MISMATCHES | 35 |
| ☑ UNKNOWN | 0 |
| ☑ EXCLUDED | 19 |

REAL TIME AUDIT VIEW — FACILITY ▽

YARD UTILIZATION*
119 / 150 (79%)

| ACTIONS ⓘ | LOCATION △ | STATUS ⇅ | OBSERVED STATE ⇅ | VIRTUAL STATE | OBSERVED LAST UPDATED TIME | VIRTUAL LAST UPDATED TIME |
|---|---|---|---|---|---|---|
| EXCLUDED ▽ | SLIPID 01 | EXCLUDED | ? | UNOCCUPIED | DATE: TIME | DATE: TIME |
| EXCLUDED ▽ | SLIPID 02 | EXCLUDED | OCCUPIED | ? | DATE: TIME | DATE: TIME |
| EXCLUDED ▽ | SLIPID 03 | EXCLUDED | OCCUPIED | ? | DATE: TIME | DATE: TIME |
| EXCLUDED ▽ | SLIPID 04 | EXCLUDED | UNOCCUPIED | ? | DATE: TIME | DATE: TIME |
| EXCLUDED ▽ | SLIPID 05 | EXCLUDED | OCCUPIED | ? | DATE: TIME | DATE: TIME |
| EXCLUDED ▽ | SLIPID 06 | EXCLUDED | OCCUPIED | ? | DATE: TIME | DATE: TIME |
| OK ▽ | SLIPID 07 | MATCH | OCCUPIED | OCCUPIED | DATE: TIME | DATE: TIME |
| OK ▽ | SLIPID 08 | MATCH | OCCUPIED | OCCUPIED | DATE: TIME | DATE: TIME |
| OK ▽ | SLIPID 09 | MISMATCH | OCCUPIED | UNOCCUPIED | DATE: TIME | DATE: TIME |
| OK ▽ | SLIPID 10 | MATCH | OCCUPIED | OCCUPIED | DATE: TIME | DATE: TIME |
| OK ▽ | SLIPID 11 | MATCH | OCCUPIED | OCCUPIED | DATE: TIME | DATE: TIME |

FIG. 14

REAL-TIME AUTOMATED YARD AUDIT

BACKGROUND

Retailers, wholesalers, and other product distributors typically maintain an inventory of various items that may be ordered, leased, borrowed, rented, viewed, and so forth, by clients or customers. For example, an e-commerce website may maintain inventory in a fulfillment center. When a customer orders an item, the item is picked from inventory, packed, and shipped to the customer. Many fulfillment centers utilize a fulfillment yard (or truck yard) where items to be stored in inventory within the fulfillment center can be delivered and unloaded from delivery trucks and/or items that have been picked from inventory can be loaded onto delivery trucks and shipped to the customer.

Fulfillment centers typically require associates to periodically perform a manual audit of the fulfillment yard in order to maintain the health of the yard, keep track of yard equipment, etc. For example, a manual yard audit generally involves one or more associates walking through the yard and checking the state of each yard slip and dock door (e.g., determining whether the yard slip is occupied, determining the condition of any trailers (or containers) in the yard slip, etc.). The associate(s) may verify that the (observed) state of the yard slip matches a virtual state of the yard slip in a management system. If not, the associate(s) may update the management system with the (observed) state.

Performing manual audits, however, can be inefficient and time consuming. For example, in large fulfillment yards, it can take an associate a significant amount of time to walk through the yard and manually check the state of each yard slip. Moreover, given that fulfillment centers typically require a manual audit to be performed periodically throughout a day (e.g., once/twice per shift), a given associate can often spend a large amount of time in the actual fulfillment yard. Further, manual audits can pose safety risks to associates. In some cases, for example, the associate as part of the manual audit may perform directed moves of assets (e.g., trailers, trucks or other equipment) inside the yard, inspect damages, move assets to and from offsite yards, etc. Associate(s) may have an increased chance of encountering a yard incident while performing these tasks.

BRIEF DESCRIPTION OF DRAWINGS

Various embodiments in accordance with the present disclosure will be described with reference to the drawings, where like designations denote like elements.

FIG. 4A is a top down view of a yard, according to one embodiment.

FIG. 4B depicts an example base map of the yard depicted in FIG. 4A, according to one embodiment.

FIG. 7A depicts an example of point cloud data from LIDAR sensors used for a virtual representation of a yard, according to one embodiment.

FIG. 7B depicts an example of assigning asset identifiers to assets in a virtual representation of a yard, according to one embodiment.

FIGS. 9A-9C depict an example of tracking an asset in a virtual representation, according to one embodiment.

FIGS. 10A-10B depict an example tracking sequence for a scenario in which assets are decoupled, according to one embodiment.

FIG. 14 depicts an example of real-time audit information on a user interface, according to one embodiment.

DETAILED DESCRIPTION

Figure 1:
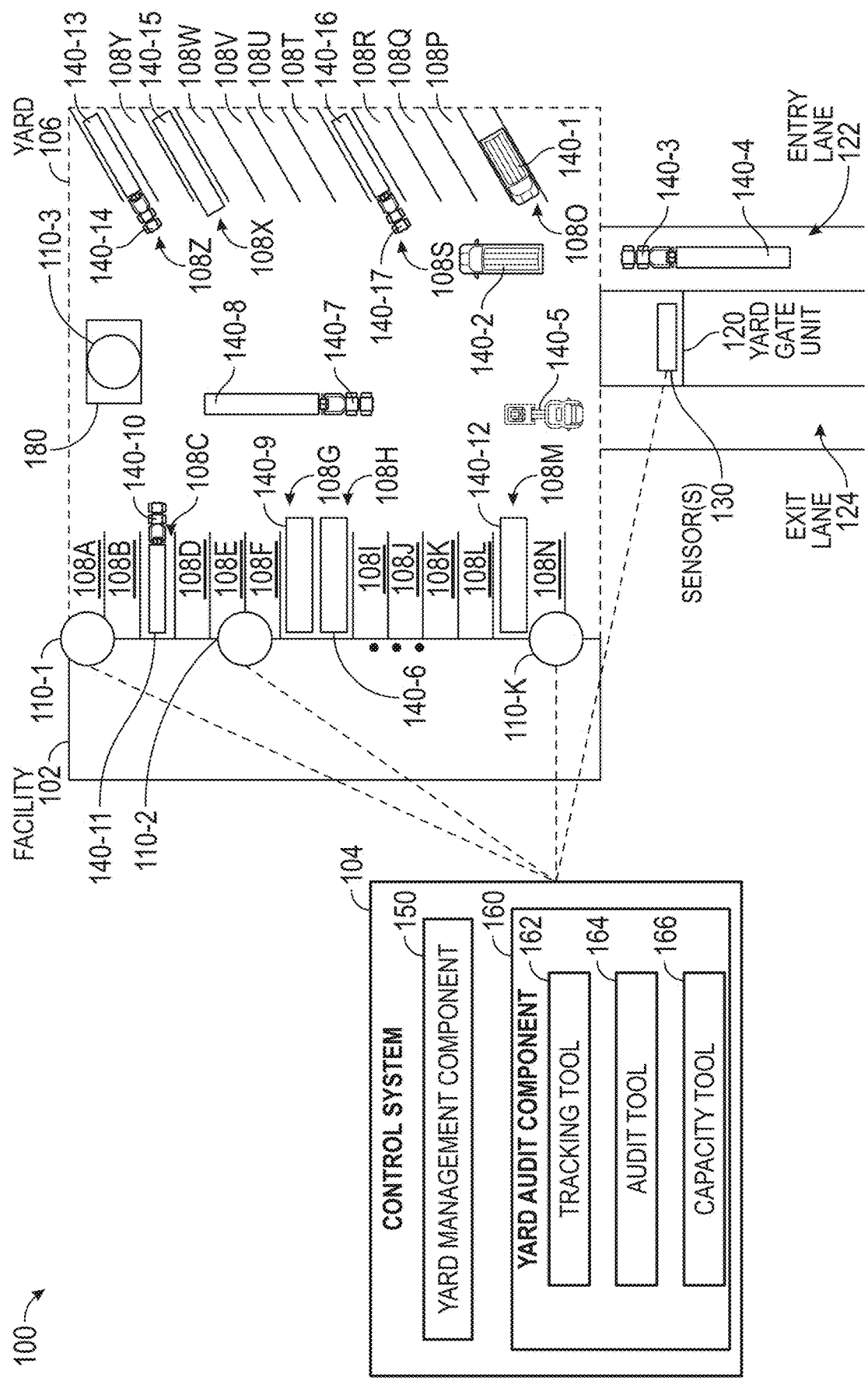
FIG. 1 is a block diagram illustrating an automated yard audit system, according to one embodiment.

Embodiments presented herein describe an automated yard audit system that is configured to conduct an audit of a fulfillment yard in real-time, significantly reducing (or even eliminating) the need for manual audits, which can be inefficient, time consuming, and pose safety risks to associates. The fulfillment yard (also referred to herein as a "truck yard," "equipment yard," or "yard") may be a designated area outside of a facility (e.g., fulfillment center) for loading items from the fulfillment center onto equipment (e.g., for delivery to customers) and/or unloading items from equipment (e.g., to be stored as inventory in the fulfillment center). At any given time, the fulfillment yard may include various different types of assets (e.g., trucks, trailers, dollies, vans, hostlers, box trucks, semi-trucks, semi-trailers, etc.) and persons (or users) (e.g., associates, maintenance personnel, security personnel, etc.) that help to manage the fulfillment yard. Asset(s) (also referred to equipment) and persons may be collectively referred to herein as "objects."

To reduce (or eliminate) the need for manual audits, the automated yard audit system uses Light Detection and Ranging (LIDAR) sensors to identify object(s) in the fulfillment yard and track the movement (or position) of the object(s) in the fulfillment yard. LIDAR (also referred to as LiDAR and LADAR) is a remote sensing method that is often employed to obtain range or depth information about a target and generate three-dimensional (3D) images (or maps) of the target. For example, LIDAR typically measures distances to a target by illuminating the target with a pulsed laser light and measuring the reflected pulses with a sensor. The reflected pulses are then used to generate 3D images. For example, the differences in laser return times and wavelengths can be used to generate virtual 3D representations of the target in the form of a point cloud.

In an automated yard audit system according to one embodiment described herein, one or more LIDAR sensors may be deployed in various (fixed) locations at the facility in proximity to the fulfillment yard. In some cases, the LIDAR sensor(s) may be deployed on an exterior (side) wall of the facility (e.g., adjacent to the fulfillment yard). In some cases, the LIDAR sensor(s) may be deployed on the roof of the facility. In some cases, one or more LIDAR sensor(s) may be deployed in the fulfillment yard (e.g., on a fixed structure in the fulfillment yard). In general, the number and/or the location of the LIDAR sensor(s) may be based on the configuration and dimensions of the facility and fulfillment yard.

The automated yard audit system uses the LIDAR sensors to generate a virtual representation of the fulfillment yard (along with the objects within the yard). The automated yard audit system may provide the virtual representation of the yard (along with the objects within the yard) to a computing system (e.g., for display on an interface of the computing system). The computing system, for example, may be used by an associate that is responsible for auditing the fulfillment yard. The automated yard audit system can also use the LIDAR sensors to track the position of the objects in the fulfillment yard. As objects move within the fulfillment yard, the automated yard audit system transmits the updated position information to the computing system, so that the virtual representation can be updated on the computing system. In this manner, the automated yard audit system enables associates to monitor the physical location of objects inside the fulfillment yard in real-time without having to walk into the yard.

In some embodiments, the automated yard audit system can assign an identifier (ID) to an object that is used to identify and track an object during the lifetime of the object in the fulfillment yard (e.g., from check-in to the fulfillment yard to check out from the fulfillment yard). For example, an asset (e.g., truck) entering the fulfillment yard may be assigned an asset ID (e.g., at the check-in location), which is used to identify the asset while the asset is in the fulfillment yard. In one embodiment, the automated yard audit system may use one or more sensor devices deployed at one or more locations in the fulfillment yard to assign the asset ID. The sensor device(s) can include, for example, proximity sensors, camera sensors, global positioning system (GPS) sensors, radio frequency identification (RFID) devices, and the like. In one particular embodiment, the automated yard audit system may use a camera sensor (e.g., license plate reader) to read identifying information (e.g., license plate) on an asset and identify the type of asset based on the identifying information. The automated yard audit system may assign an asset ID (or, in general, an object ID) to the asset, based on the type of asset. The asset ID may be displayed and updated on the virtual representation of the fulfillment yard, as the asset is tracked within the fulfillment yard.

The automated yard audit system enables a user (e.g., yard associate, yard manager, yard administrator, etc.) to conduct an audit of the fulfillment yard in real-time, without walking into the fulfillment yard. Using the automated yard audit system, for example, the user can determine the (physical) state of a yard slip within the fulfillment yard (e.g., whether the yard slip is occupied or unoccupied) from the perspective of the LIDAR sensors and determine a (virtual) state of the yard slip from the perspective of a yard management system. If the physical state of a given yard slip matches the virtual state of the yard slip, then the user can refrain from visiting that yard slip to determine the state of the yard slip. If, however, the physical state of a given yard slip does not match the virtual state of the yard slip (e.g., the physical state indicates the yard slip is occupied but the virtual state indicates the yard slip is unoccupied, or vice versa), then the user may visit that yard slip to resolve the discrepancy. Thus, by using the automated yard audit system in this manner, embodiments can significantly reduce (or even eliminate) the need for a user to walk into the fulfillment yard in order to conduct an audit.

In some embodiments, the automated yard audit system may provide information (in real time) that enables improved management of the fulfillment yard. In many situations, the user(s) may not have knowledge of the current occupancy and capacity of the yard. For example, during peak times, there may be a large amount of inbound and outbound traffic within the fulfillment yard. During these times, it may be difficult for a user to accurately determine whether the fulfillment yard can accommodate assets attempting to enter the fulfillment yard. For example, the user may not know whether a yard slip that was previously occupied (at the time of a last manual audit) is now currently unoccupied, and vice versa. In other cases, the user may be unaware of an asset that has malfunctioned in the yard (e.g., the asset may be stuck in a particular yard slip or other location, the asset may be blocking an inbound/outbound lane, etc.).

According to one embodiment herein, the automated yard audit system can determine current information regarding the occupancy and capacity within the fulfillment yard, and provide the information to a user (e.g., via the user's computing system). The user may then manage operations within the fulfillment yard, based on the information (e.g., assigning slip locations to assets, coordinating repair operations, determining yard utilization, restricting entry into the fulfillment yard, etc.). The information (collectively referred to herein as "yard capacity information") may include, but is not limited to, the number of occupied yard slips, the number of unoccupied yard slips, the total number of yard slips, the number of operational yard slips, the number of non-operational yard slips (e.g., yard slip is undergoing maintenance), the fulfillment yard utilization (e.g., percentage of yard slips being utilized), and the like.

In some cases, the yard capacity information may include information regarding the number of assets waiting to check into the fulfillment yard and/or check out from the fulfillment yard. In some cases, the yard capacity information may include congestion information, such as the dwell time of assets within the fulfillment yard. For example, the automated yard audit system may divide the fulfillment yard into different zones and monitor how long a given asset is within a given zone. In some embodiments, the automated yard audit system may generate and transmit an electronic notification to the user if it determines that an asset is within a zone for a predetermined amount of time (e.g., above a threshold amount of time associated with the respective zone). With such information, the automated yard audit system can enable users to quickly identify malfunctioning assets in the fulfillment yard.

Note that while some embodiments are described herein with reference to tracking assets in a fulfillment yard outside of a fulfillment center, such examples are provided for illustrative purposes only and without limitation. In other embodiments, the automated yard audit system can be used to track assets and other objects inside of a facility (e.g., inside of a fulfillment center, an indoor fulfillment yard, etc.). For example, the automated yard audit system can be used to track the movement of packages inside of a facility, at the dock and at the receive locations, at a prepping location, at a picking location, at pack and slam process paths, etc. In embodiments where the automated yard audit system is used indoors, the automated yard audit system can improve the detection of missorts, perform container audits, etc.

FIG. 1 depicts an example an automated yard audit system 100, according to one embodiment. The automated yard audit system 100 may be deployed for a facility 102 (e.g., warehouse, distribution facility, fulfillment center, retail store, etc.) and yard 106. The yard 106 may be used for various functions (e.g., storage, delivery, picking, fulfillment, etc.). In the depicted example, the yard 106 is outside of and adjacent to the facility 102, and may be used for delivery and fulfillment of items for the facility 102. Further, although not shown, there may be multiple yards 106 for a given facility.

The yard 106 includes multiple yard slips 108 A-Z (also referred to herein as "parking slips," "yard locations," "parking locations," or "delivery slips"). In some embodiments, at least some of the yard slips 108 may be adjacent to one or more docking doors (not shown) of the facility 102. In FIG. 1, for example, each yard slip 110 A-N may be adjacent to a different docking door (not shown) of the facility 102. In another example, a docking door (not shown) may be provided for a subset of the yard slips 110 A-N (e.g., yard slips 108A, 108F, and 108N may be adjacent to a docking door of the facility 102).

The yard 106 also includes various types of assets 140 1-17 that are involved in delivering and retrieving items from the facility 102. In FIG. 1, for example, the assets 140 may include trucks (or hostlers) (e.g., assets 140-3, 140-5, 140-7, 140-10, 140-14, and 140-17), trailers (e.g., assets 140-4, 140-6, 140-8, 140-9, 140-11, 140-12, 140-13, 140-15, and 140-16), vans (e.g., assets 140-1 and 140-2), dolleys, and the like. A yard gate unit 120 may check assets 140 (e.g., at entry lane 122) into the yard 106 and check out assets 140 (e.g., at exit lane 124) from the yard 106. In one embodiment, the yard gate unit 120 may be an automated unit that checks in and checks out assets 140. In another embodiment, the yard gate unit 120 may be a facility (or a fixed structure) that is occupied by one or more users responsible for checking in and checking out assets 140. In yet another embodiment, the yard gate unit 120 may be occupied by users and include computing systems/devices for automated check in/check out.

Many facilities typically require users (e.g., yard associates) to perform audits of the yard 106, e.g., to determine the state of the yard slips 108, keep track of assets 140 in the yard 106, determine the state of the assets 140, etc. As noted, however, a manual audit typically involves walking through the yard 106 to check the state of each yard slip 108, which can take a significant amount of time (e.g., especially in yards with a large amount of yard slips). In addition, the yard audit information from manual audits can often be inaccurate. For example, as manual audits are typically performed a few times during a day's operation, the state of a given yard slip may change multiple times between manual audits. In FIG. 1, for example, yard slip 108A is currently unoccupied, but may have been previously occupied by an asset 140 at the time of the last manual audit. Consequently, operating on inaccurate yard state data can impact the efficiency and management of the yard 106. Further, manual audits can pose safety risks to users. For example, safety hazards can be created by the inbound and/or outbound traffic within the yard 106, the weather conditions at the time of the audit, inspecting the asset 140 at each yard slip 108, etc.

To address the above, the automated yard audit system 100 can use one or more LIDAR sensors 110 1-K to identify and track assets 140 (or objects, in general) within the yard 106. In one embodiment, the LIDAR sensors 110 may be deployed at various stationary or fixed locations. In FIG. 1, for example, one or more of the LIDAR sensors 110 may be deployed on an exterior wall of the facility 102. In another example, one or more of the LIDAR sensors 110 may be deployed on the roof of the facility 102. In yet another example, at least one LIDAR sensor (e.g., LIDAR sensor 110-3) may be deployed within the yard 106 (e.g., on a fixed structure 180). In general, the number and/or location of the LIDAR sensors 110 may depend in part on the capabilities of the LIDAR sensors (e.g., horizontal and/or vertical field of view (FOV)), dimensions of the facility 102, and/or configuration/layout of the yard 106. For example, the automated yard audit system 100 may have a number of LIDAR sensors 110 sufficient to identify and track movement of all the assets 140 within the yard 106.

The automated yard audit system 100 includes a control system 104, which is communicatively coupled to the LIDAR sensors 110 and configured to implement one or more of the techniques described herein for conducting a real-time audit of the yard 106. The control system 104 includes a yard management component 150 and a yard audit component 160, each of which can include hardware components, software modules, or combinations thereof.

The yard management component 150 can be used to manage operations within the yard 106. For example, a user can use the yard management component 150 to control the availability of yard slips 108, assign (or direct) an asset 140 to dock at a particular yard slip 108, change the virtual state (e.g., occupied, unoccupied, operational, non-operational, etc.) of a yard slip 108 (e.g., in a database or another computing system), check in an asset 140 to the yard 106, check out an asset 140 from the yard 106, etc. In some embodiments, the yard management component 150 may provide the user with a base (or initial) virtual representation (e.g., virtual two dimensional (2D) or 3D map) of the yard 106. The base virtual representation of the yard 106 may be generated using a mapping tool (e.g., LIDAR sensor) (not shown) and may identify the yard slip locations and yard docking doors. In one embodiment, the base virtual representation of the yard 106 can be used to determine the number and/or deployment positions (or locations) of the LIDAR sensors 110. In one embodiment, the yard management component 150 may assign a yard slip ID to each yard slip 108 identified via the base virtual representation of the yard 106.

The yard audit component 160 can identify, track, and audit assets 140 in the yard 106 in real-time. In this embodiment, the yard audit component 160 includes a tracking tool 162, an audit tool 164, and a capacity tool 166, each of which can include hardware components, software modules, or combinations thereof. In one embodiment, the tracking tool 162 can identify each asset 140 that attempts to enter the yard 106. For example, the tracking tool 162 can detect the presence of an asset 140 at the yard gate unit 120 using a first sensor 130 (e.g., proximity sensor) located at the yard gate unit 120 and determine the type of asset 140 using a second sensor 130 (e.g., camera sensor(s)) at the yard gate unit 120. The tracking tool 162 may assign an asset ID to each asset 140 that enters the yard 106. The asset ID may stay with (e.g., be associated with) the asset 140 while the asset 140 is located in the yard 106.

In one embodiment, the asset ID that is assigned to a given asset 140 may be based on the type of asset (e.g., trucks may be assigned certain asset IDs, trailers may be assigned certain asset IDs, etc.). In another embodiment, the asset ID that is assigned to a given asset 140 may be a preconfigured asset ID associated with the given asset 140 (e.g., the asset 140 may be an asset previously associated with the facility 102). In yet another embodiment, the asset ID that is assigned to a given asset 140 may be an available asset ID from a set of asset IDs. In some embodiments, in cases where first and second assets 140 are joined together (e.g., a semi-trailer), the tracking tool 162 can assign a first asset ID to the first asset 140 (e.g., semi-truck (or hostler), such as asset 140-3) and a second different asset ID to the second asset 140 (e.g., trailer, such as asset 140-4). In other embodiments, the tracking tool 162 can assign a single asset ID to the first and second assets 140 that are joined together, and assign separate asset IDs to the first and second assets 140 once they are separated.

In one embodiment, the tracking tool 162 can track and report (in real time) any movement of assets 140 within the yard 106. In FIG. 1, for example, the tracking tool 162 may track and report (in real time) the movement of assets 140-2, 140-5, 140-7, and 140-8 within the yard 106. The tracking tool 162 may generate a virtual representation of the yard 106 (using data received from LIDAR sensors 110) and send information associated with the virtual representation to a user device for display on a user interface. In one embodiment, the information associated with the virtual representation can include the positions (or locations) of the assets 140 within the yard 106, the asset IDs of the assets 140 within the yard 106, etc. In some examples, the position of an asset 140 may be represented by the asset ID associated with the asset 140. In some examples, the position of the asset 140 may be represented by the asset ID along with the 3D point cloud of the asset 140. The tracking tool 162 can update the virtual representation, e.g., in real-time, to show the movement of the asset 140 within the yard 106.

In one embodiment, the audit tool 164 can perform a real-time audit of the yard 106 in real-time. As part of performing the audit, the audit tool 164 can determine the state of each yard slip 108 (e.g., whether the yard slip 108 is occupied, unoccupied, operational, or non-operational). In FIG. 1, for example, the audit tool 164 can determine in real-time that the yard slips 108A, 108B, 108 D-F, 108 I-L, 108N, 108 P-R, 108 T-W, and 108Y are currently unoccupied, and that yard slips 108C, 108G, 108H, 108M, 108O, 108S, 108X, and 108Z are currently occupied. The audit tool 164 can also determine the type of asset (e.g., van, semi-truck, semi-trailer, trailer, etc.) in each of the occupied yard slips, based on the asset ID in that yard slip. In FIG. 1, for example, the audit tool 164 can determine that yard slip 108C is occupied by assets 140-10 (e.g., semi-truck) and 140-11 (e.g., trailer), yard slip 108G is occupied by asset 140-9 (e.g., trailer), yard slip 108H is occupied by asset 140-6 (e.g., trailer), yard slip 108M is occupied by asset 140-12 (e.g., trailer), yard slip 108O is occupied by asset 140-1 (e.g., van), yard slip 108S is occupied by assets 140-17 (e.g., semi-truck) and 140-16 (e.g., trailer), yard slip 108X is occupied by asset 140-15 (e.g., trailer), and yard slip 108Z is occupied by assets 104-14 (e.g., semi-truck) and 140-13 (e.g., trailer).

In one embodiment, the audit tool 164 transmit the real-time audit information to a user device (e.g., for display on a user interface). The audit information may indicate at least one of the yard slip location ID, the observed (or physical) state of the yard slip (e.g., from the perspective of the audit tool 164), the virtual state of the yard slip (e.g., from the perspective of the yard management component 150), the status of the yard slip location (e.g., whether the observed and virtual states match), an indication of when (e.g., date/time) the observed state was updated, and an indication of when the virtual state was updated. With such audit information, the user can determine instances where the observed state of a yard slip 108 differs from the virtual state of the yard slip. In some cases, the audit tool 164 can highlight such instances on a user interface of the user device. Based on this information, the user may visit the yard slip with the mismatched status to determine the reason for the mismatch, as opposed to having to visit each yard slip 108 in the yard 106.

In one embodiment, the capacity tool 166 can determine real-time yard capacity information for the yard 106 that can be used for managing operations in the yard 106. As noted, the information may include, but is not limited to, the number of occupied yard slips, the number of unoccupied yard slips, the number of assets in the entry lane 122 (e.g., waiting to check into the yard 106), the number of assets 140 in the exit lane 124 (e.g., waiting to check out from the yard 106) the total number of yard slips, the amount of time (e.g., dwell time) an asset 140 is in a given area (or zone) of the yard 106, the number of operational yard slips, the number of nonoperational yard slips (e.g., yard slip is undergoing maintenance), the fulfillment yard utilization (e.g., percentage of yard slips being utilized), and the like. The capacity tool 166 may transmit the yard capacity information to a user device, e.g., for display on a user interface.

Note that FIG. 1 illustrates merely a reference example of an environment in which the techniques presented herein for monitoring, tracking, auditing, and managing assets in a fulfillment yard can be used. The techniques presented herein can be used in other configurations of the automated yard audit system. For example, while FIG. 1 depicts the yard management component 150 and the yard audit component 160 within a single control system 104, in other embodiments, the yard management component 150 and the yard audit component 160 may be located on different computing systems. In some embodiments, one or more components of the yard audit component 160 (e.g., tracking tool 162, audit tool 164, and capacity tool 166) may be located on different computing systems. In some embodiments, the yard management component 150 and/or the yard audit component 160 may be distributed across one or more computing systems in a cloud computing environment.

Figure 2:
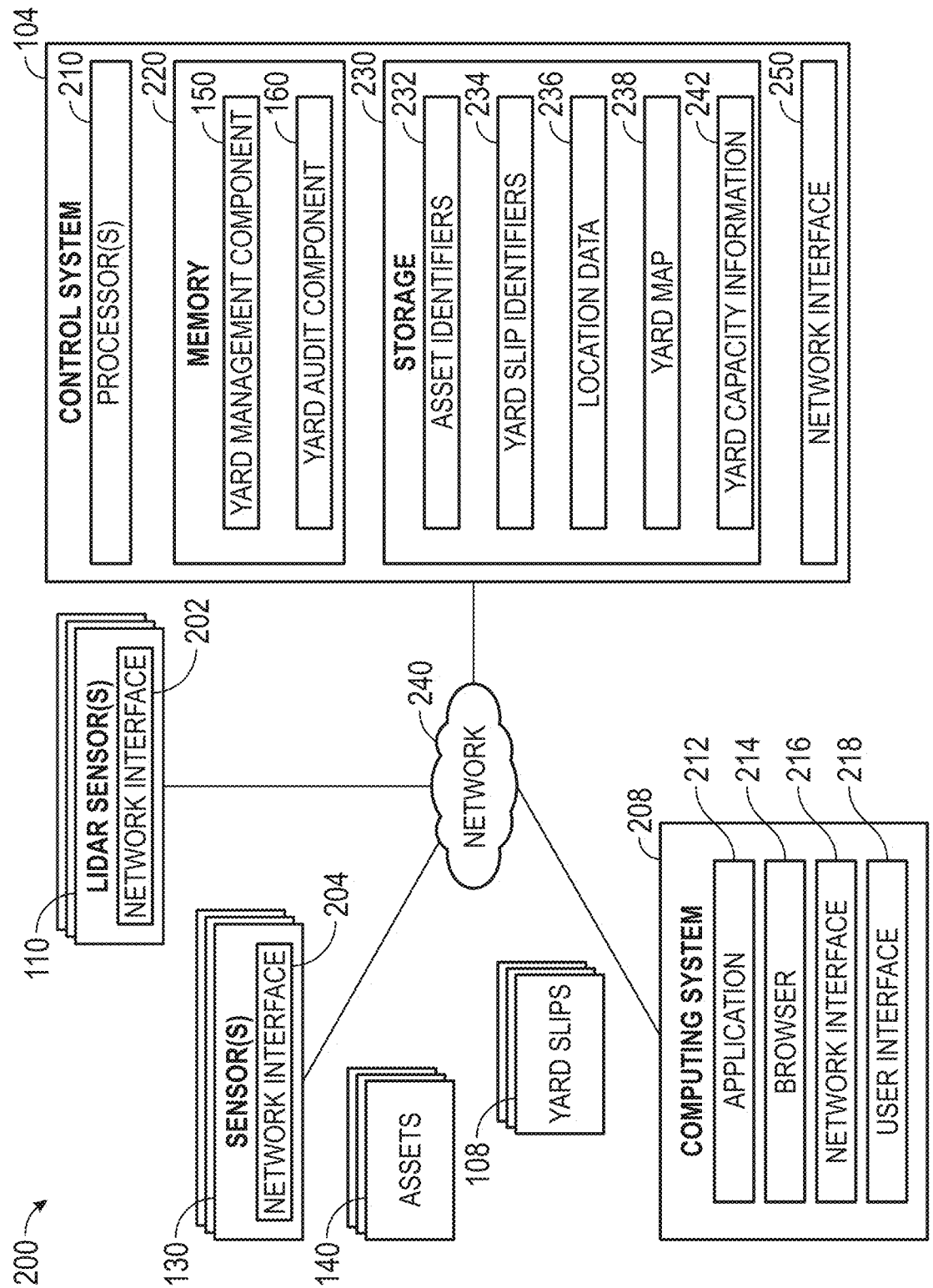
FIG. 2 is a block diagram illustrating an example network architecture for an automated yard audit system, according to one embodiment.

FIG. 2 is a block diagram of an example network architecture 200 for an automated yard audit system 100, according to one embodiment. The network architecture 200 includes the control system 104, LIDAR sensors 110, sensor(s) 130, and a computing system 208, which are interconnected via a network 240. The control system 104 and the computing system 208 are representative of a variety of computing devices (or systems), including a laptop computer, mobile computer (e.g., a tablet or a smartphone), server, etc. In one embodiment, one or more components of the control system 104 may be distributed across multiple computing systems in a cloud computing environment. In one embodiment, the computing system 208 may be located at an entry point to a yard (e.g., yard gate unit 120 depicted in FIG. 1). The network 240, in general, may be a wide area network (WAN), a local area network (LAN) (e.g., Ethernet), a wireless LAN, a personal area network (PAN), a cellular network, etc. In a particular environment, the network 240 is the Internet.

One or more LIDAR sensors 110 are communicatively coupled to the control system 104, e.g., via the network interface 202. Each LIDAR sensor 110 may use the network interface 202 to communicate (scanning) data (e.g., range or depth information) obtained by the LIDAR sensor 110 regarding a target. The network interface 202 may be any type of network communications interface that allows the LIDAR sensors 110 to communicate with other computers and/or components in the network architecture 200 via a data communications network (e.g., network 240).

One or more sensors 130 can also be communicatively coupled to the control system 104, e.g., via the network interface 204. The sensor(s) 130 may use the network interface 204 to communicate information regarding an asset attempting to check into the yard 106 and/or check out from the yard 106 (e.g., via the yard gate unit 120 depicted in FIG. 1). The sensor(s) 130 may include proximity sensors, LIDAR sensors, camera sensors, location sensors (e.g., GPS), RFID devices (or tags), etc. For example, in some cases, at least one of the sensors 130 may be a proximity sensor configured to detect the presence of assets 140 attempting to enter and/or exit the yard 106. Additionally or alternatively, at least one of the sensors 130 may be a camera sensor (e.g., license plate reader) configured to scan identifying information (e.g., license plate) of an asset 140 and determine a type of the asset based on the identifying information. Additionally or alternatively, at least one of the sensors 130 may be a LIDAR sensor configured to determine and keep track of the number of assets attempting to check out the yard 106 and/or check-in to the yard 106. The network interface 204 may be any type of network communications interface that allows the one or more sensors 130 to communicate with other computers and/or components in the network architecture 200 via a data communications network (e.g., network 240).

The control system 104 includes processor(s) 210, a memory 220 (e.g., volatile, non-volatile, etc.), storage 230, and a network interface 250. The storage 230 may be a combination of a fixed and/or removable storage, such as fixed disc drives, removable memory cards, optical storage, network attached storage (NAS), or storage-area-network (SAN). The network interface 250 may be any type of network communications interface that allows the control system 104 to communicate with other computers and/or components in the network architecture 200 via a data communications network (e.g., network 240).

The memory 220 includes a yard management component 150 and a yard audit component 160, each of which can include hardware and/or software components. The storage 230 includes asset IDs 232, yard slip IDs 234, location data 236, a yard map 238, and yard capacity information 242. The yard map 238 may be an initial base map of the yard that is generated with a mapping tool. In some embodiments, as opposed to generating the yard map 238, the yard map 238 may be received from another computing system (not shown). The yard map 238 may be used to determine the number and/or deployment positions of the LIDAR sensors 110, and/or identify the yard slips 108. The yard management component 150 may assign slip IDs 234 to the yard slips 108 identified from the yard map 238.

The yard audit component 160 may assign an asset ID 232 to each asset 140 upon check in (e.g., at the yard gate unit 120). The yard audit component 160 may receive asset location data 236 from the LIDAR sensor(s) 110 and/or sensor(s) 130, and transmit the asset location data 236 to the computing system 208. In addition, the yard audit component 242 may determine yard capacity information 242 and transmit the yard capacity information 242 to the computing system 208.

The computing system 208 is generally configured to host applications used to access the control system 104. Here, for example, the computing system 208 includes an application 212, a (web) browser 214, a network interface 216, and a user interface 218. The network interface 216 may be any type of network communications interface that allows the computing system 208 to communicate with other computers and/or components in the network architecture 200 via a data communications network (e.g., network 240).

The application 212 is representative of a component of a client server application (or other distributed application) which can communicate with the control system 104 over the network 240. Application 212 may be a "thin" client where the processing is largely directed by the application 212, but performed by components (e.g., yard management component 150, yard audit component 160) of the control system 104, or a conventional software application installed on the computing system 208. The browser 214 may be used to access components (e.g., yard management component 150, yard audit component 160) of the control system 104 by rendering web pages received from the components.

In one embodiment, the yard management component 150 and/or the yard audit component 160 may be modeled as a service back-end (e.g., web server, application server, and database), and the application 212 and/or the browser 214 may be modeled as a service front-end. Of course, other software architectures or distributed application frameworks could be used. For example, in general, the yard management component 150 and/or the yard audit component 160 may be implemented using any suitable software programming language, application framework, web service solution stack, virtual application containers, etc., in order to present yard management application features and content to a user (e.g., yard associate). In some examples, the yard management component 150 and/or the yard audit component 160 may respond to requests from users (e.g., yard associates) by generating hypertext markup language (HTML) and related content that can be passed to users and rendered as a user interface 218. The content may include, for example, HTML components, code that generates HTML components, instructions executable by the computing system 108 to display the user interface 218 (e.g., using language-specific or operating systems-specific application content), etc. In some cases, the application 212 and/or the browser 214 could generate information (or application) content to present data retrieved from the yard management component 150 and/or the yard audit component 160.

A user can access the yard management component 150 and/or the yard audit component 160, e.g., via the application 212 and/or the browser 214 on computing system 108. In one embodiment, the yard management component 150 may provide the yard map 238 on the user interface 218 to enable a user to assign slip IDs 234 to the yard slips 108, control the availability of the yard slips 108 and docking doors in the yard 106, create and/or update the (virtual) state of yard slips 108, assign assets 140 to yard slips 108, etc. In one embodiment, the yard audit component 160 may provide a virtual representation (e.g., 3D map) of the yard 106 on the user interface 218 and indicate the positions of the assets 140 on the virtual representation. The yard audit component 160 can update the positions of the assets 140 (e.g., using location data 236) in real-time on the virtual representation, as the yard audit component 160 tracks the movement of the assets 140 (e.g., using LIDAR sensors 110).

Figure 3:
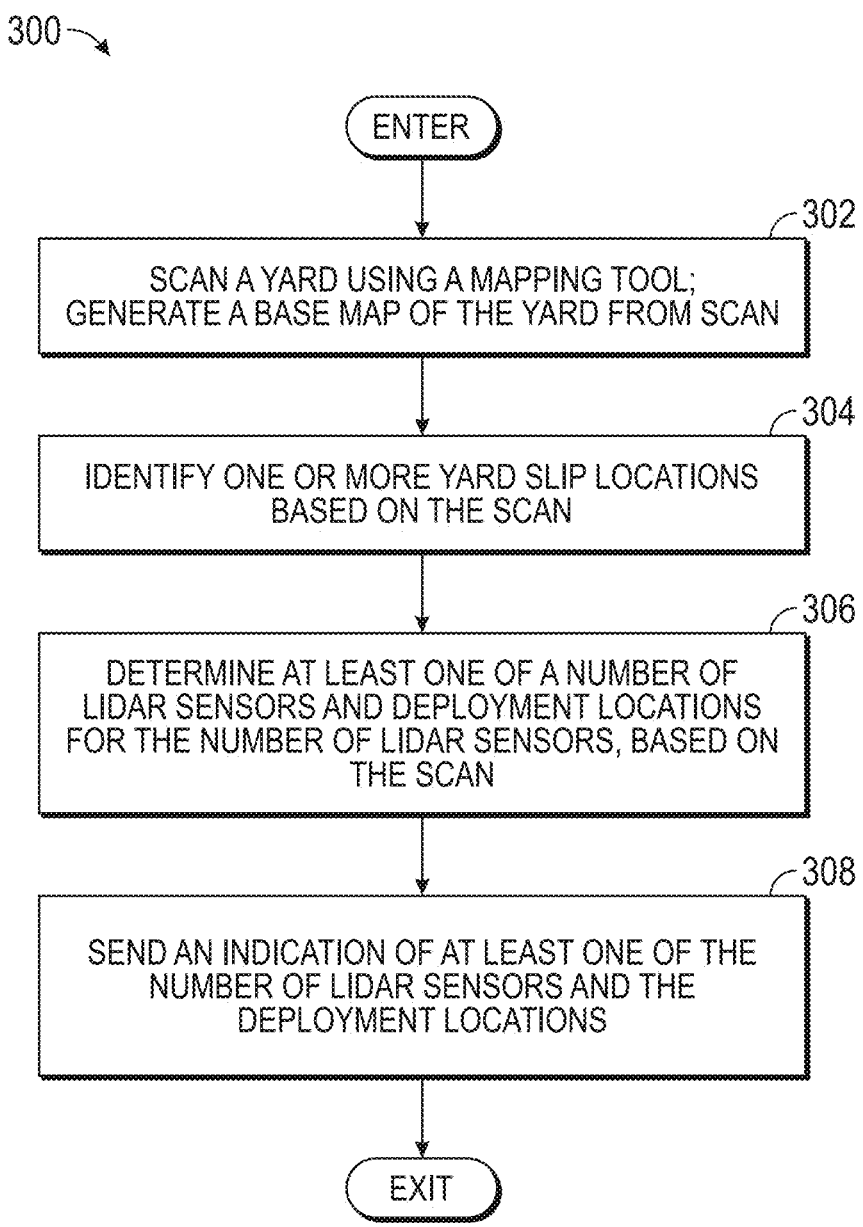
FIG. 3 is a flowchart of a method for deploying Light Detection and Ranging (LIDAR) sensors to track objects in a yard, according to one embodiment.

FIG. 3 is a flowchart of a method 300 for deploying LIDAR sensors (e.g., LIDAR sensors 110) to track objects within a yard (e.g., yard 106), according to one embodiment. The method 300 may be performed by a control system (e.g., control system 104).

As shown, the method 300 may enter at block 302, where the yard is scanned using a mapping tool. In one embodiment, the mapping tool may be a LIDAR sensor. The mapping tool may be hand carried, vehicle mounted, or drone mounted. FIG. 4A, for example, depicts a top down view 400A of a yard 406 that can be scanned using a drone mounted mapping tool. Additionally, at block 302, the control system may generate a base (or initial) map of the yard (e.g., yard map 238) from the scan. The base map may indicate the physical layout (or configuration) of the yard. The base map may be a 2D map or a 3D map. FIG. 4B, for example, depicts an example 2D map 400B generated for the yard 406 depicted in FIG. 4A.

At block 304, the control system identifies one or more yard slip locations (e.g., yard slips 108) based on the scan. In one embodiment, the control system may assign a yard slip ID (e.g., slip ID 234) to each yard slip location identified from the scan. At block 306, the control system determines at least one of (i) a number of LIDAR sensors to use for tracking objects within the yard and (ii) a deployment location for each of the number of LIDAR sensors, based on the scan. The number of LIDAR sensors and/or the deployment location for each LIDAR sensor may depend in part on the operational capability (e.g., horizontal/vertical FOV, range, etc.) of the LIDAR sensor. In some cases, the number of LIDAR sensors and/or the deployment locations may be based on the configuration of the yard. At block 308, the control system sends an indication of at least one of the number of LIDAR sensors and the deployment locations (e.g., to another computing system).

Figure 5:
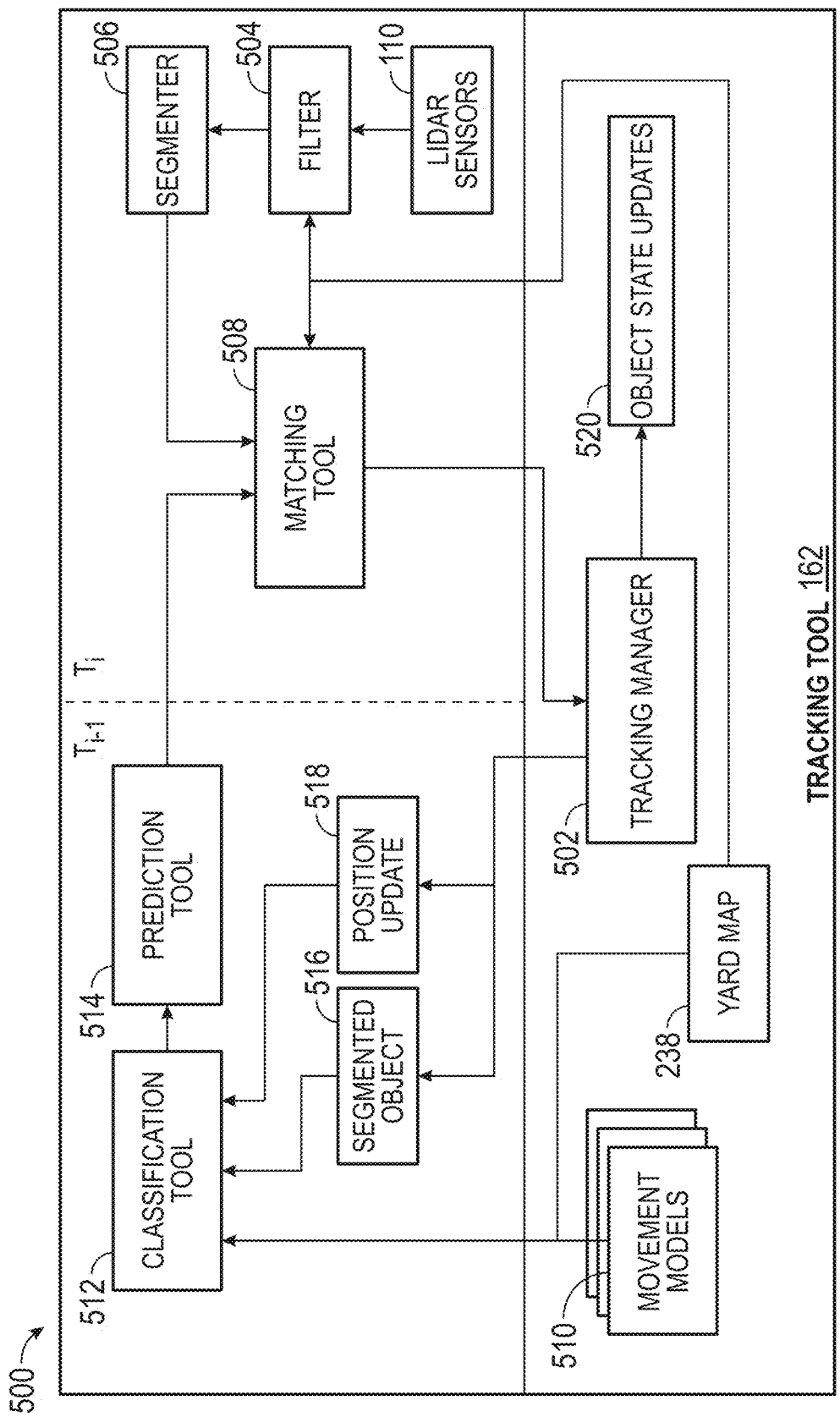
FIG. 5 depicts an example workflow for tracking objects in real-time within a yard, according to one embodiment.

FIG. 5 depicts an example workflow 500 for tracking objects (e.g., assets 140) in real-time in a yard (e.g., yard 106), according to one embodiment. The workflow 500 may be implemented by one or more components of the tracking tool 162. As shown, the tracking tool 162 includes a tracking manager 502, which tracks objects over one or more time instances, a filter 504, a segmenter 506, a matching tool 508, one or more movement models 510, a classification tool 512, and a prediction tool 514.

The workflow 500 may combine data from a previous workflow run (e.g., $T_{i-1}$) with the current workflow run (e.g., $T_i$) in order to accurately track objects over time. In the current workflow run, for example, the filter 504 may receive sensor data from LIDAR sensors 110 and filter the sensor data to remove unwanted objects. The sensor data may include local point cloud data of the yard 106 from several different orientations (e.g., due to the different positions/orientations of the LIDAR sensors 110). Thus, in some cases, although not shown, the sensor data from the LIDAR sensors 110 may be combined and aligned to generate a global point cloud of the yard 106, before being sent to the filter 504. The filter 504 can filter the sensor data using a background subtraction process, which removes objects, such as the facility 102, adjacent structures (e.g., neighboring facilities), trees, etc. In one embodiment, the filter 504 may use information from the yard map 238 to determine which object(s) in the yard 106 to remove. Once filtered, the segmenter 506 may perform a clustering technique to break the global point cloud into smaller size point clouds (e.g., clusters). In one embodiment, the segmenter 506 may implement a Euclidean clustering method to segment the global point cloud into smaller point cloud.

The segmented objects may be sent to the matching tool 508, which evaluates the segmented objects from the current workflow run with predicted objects from the previous workflow run. For example, the tracking manager 502 may output one or more segmented objects 516 from the previous workflow run to the classification tool 512. Along with the segmented objects 516, the tracking manager 502 may send one or more position update(s) 518 for the segmented objects 516 to the classification tool 512. The classification tool 512 may evaluate the segmented objects 516 and position updates 518 using movement models 510 in order to classify the segmented objects 516 into one or more types of objects (e.g., person, trailer, semi-truck (or hostler), van, etc.). In one reference example, the classification tool 512 may determine that the movement (e.g., speed, acceleration, etc.) of a given segmented object 516 (e.g., determined from the position update 518 of that segmented object 516) corresponds to a movement model 510 for a given type of object (e.g., hostler). In another reference example, the classification tool 512 may determine that the movement of a given segmented object 516 corresponds to a movement model 510 for another type of object (e.g., semi-trailer), and so on.

Once segmented objects have been classified, the prediction tool 514 may estimate their new position, e.g., using information regarding the movement associated with the type of segmented object, the size of the type of the segmented object, etc. The matching tool 508 may combine the predicted segmented objects from the previous workflow run with the segmented objects from the current workflow run to build a match likelihood matrix, which can be used to match segmented objects, determine position changes in segmented objects, identify new segmented objects, and the like. The matching tool 508 sends its results to the tracking manager 502, which transmits (e.g., broadcasts) object state updates 520 (e.g., object creation, objection position changes) to one or more other computing systems.

Note that FIG. 5 depicts merely a reference example of an algorithm workflow that can be used to track objects in real-time in a fulfillment yard, and that other configurations of the workflow depicted in FIG. 5 can be used to track objects in real-time. For example, in some embodiments, one or more of the components of the workflow 500 may be combined into a single component (e.g., the filter 504 and the segmenter 506 may be combined). In some embodiments, one or more of the components of the workflow 500 may be removed (e.g., the workflow 500 may able to accurately track objects without one or more of the filer 504, the yard map 238, the movement models 510, etc.). In some embodiments, as opposed to using an entire yard map 238, the workflow 500 may use at least a portion of the yard map 238 (e.g., at least a portion of metadata from the yard map 238).

Figure 6:
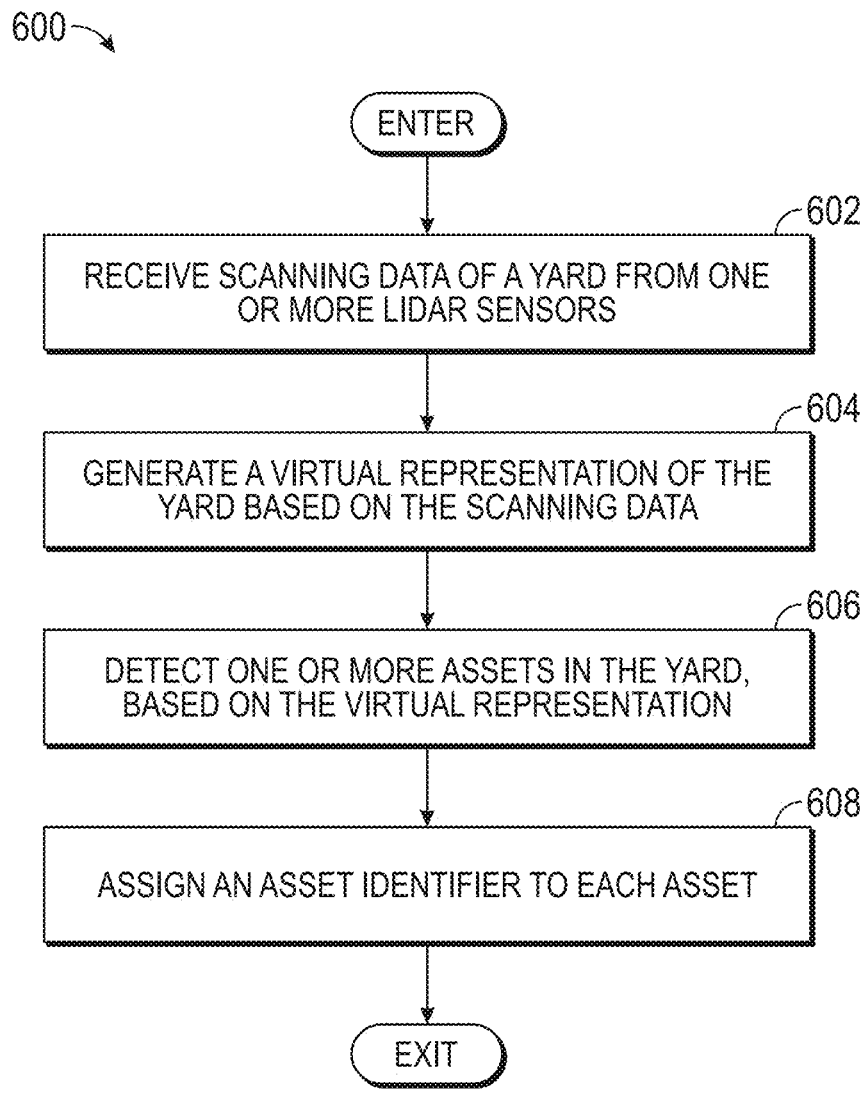
FIG. 6 is a flowchart of a method for assigning asset identifiers to assets in a yard, according to one embodiment.

FIG. 6 is a flowchart of a method 600 for assigning asset IDs to assets (e.g., assets 140) in a yard, according to one embodiment. The method 600 may be performed by a control system (e.g., control system 108).

As shown, the method 600 may enter at block 602, where the control system receives scanning data of a yard from one or more LIDAR sensors (e.g., LIDAR sensors 110). In one embodiment, each LIDAR sensor may be configured to scan at least a portion of the yard. In this embodiment, the scanning data from each of the LIDAR sensors may include local point cloud of the respective portion of the yard. At block 604, the control system generates a virtual representation of the yard, based on the scanning data. In one embodiment, the control system may generate the virtual representation by combining the local point cloud data from each of the LIDAR sensors to form a global point cloud of the entire yard. FIG. 7A depicts one reference example of (global) point cloud data from LIDAR sensors that can be used for a virtual representation 700 of the yard 706. At block 606, the control system detects one or more assets in the yard, based on the virtual representation (e.g., virtual representation 700). As shown in FIG. 7A, for example, the control system may detect assets 140 in the yard 706.

At block 608, the control system may assign an asset ID (e.g., asset ID 232) to each asset. In one embodiment, the asset ID may indicate at least one of: (i) a tracking ID, a type of the asset (e.g., trailer, hostler), and a number of points representing the asset. In FIG. 7B, for example, each asset may be assigned an asset ID having the form "X/Y/Z," where X is a tracking ID, Y indicates a type of the asset (e.g., "T" for trailer, "C" for coupled, "V" for van, "H" for hostler, and so on), and Z indicates the number of points representing the asset. Note, however, that the form "X/Y/Z" is used merely as a reference example of a type of asset ID, and that other configurations can be used for an asset ID. For the sake of clarity, FIG. 7B depicts an asset ID 232 "28/T/2346" for only a single asset 140 in the yard 706. Those of ordinary skill in the art will understand that the control system may assign asset IDs in the manner described above for other assets identified in the yard 706.

Figure 8:
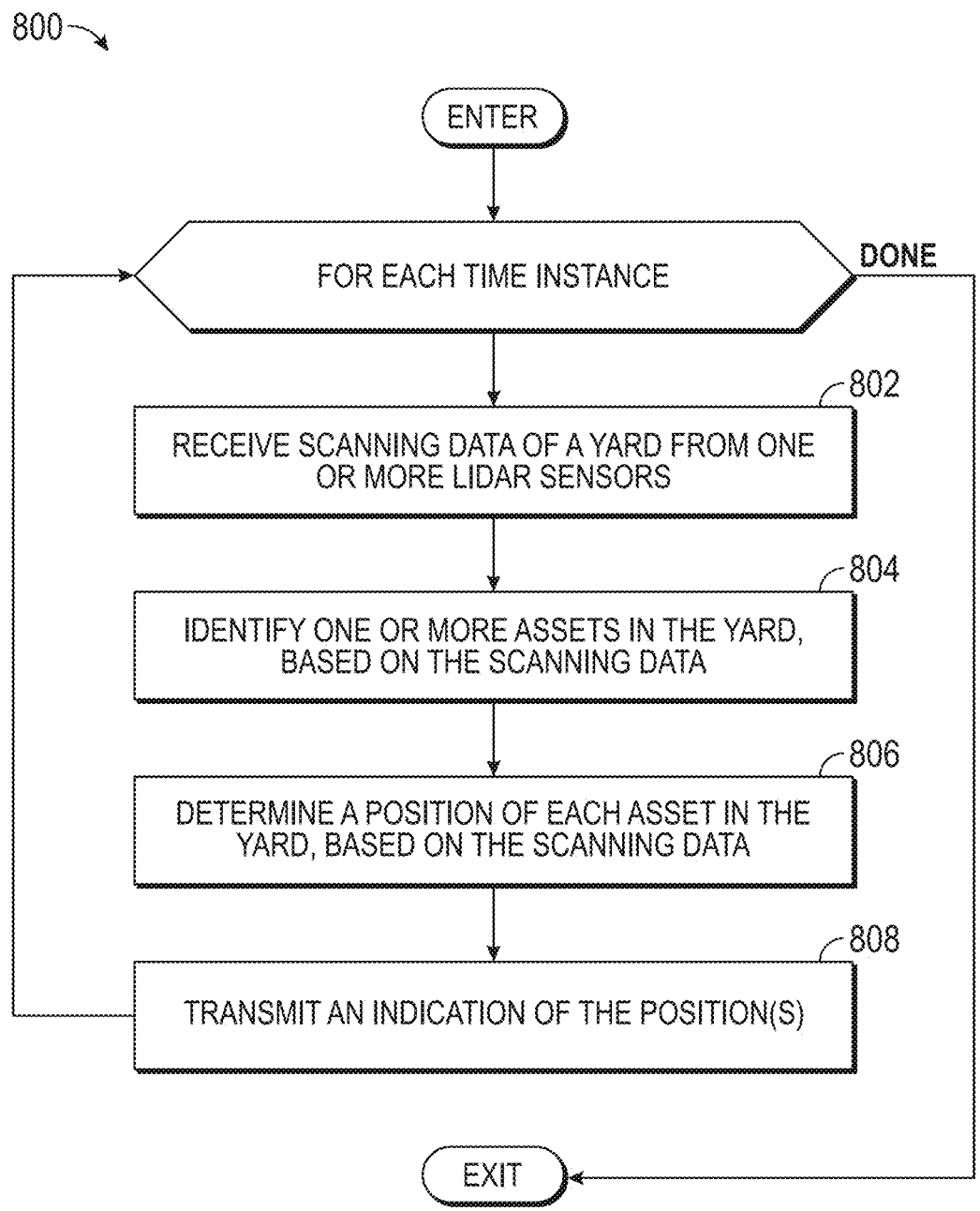
FIG. 8 is a flowchart of a method for tracking assets in a yard, according to one embodiment.

FIG. 8 is a flowchart of a method 800 for tracking assets in a yard, according to one embodiment. The method 800 may be performed by a control system (e.g., control system 108). The method 800 may be performed for each predetermined time instance of multiple time instances, e.g., within a predetermined time period, such as 12 hours, 24 hours, etc. In one embodiment, the method 800 may implement workflow 500 depicted in FIG. 5.

The method 800 may enter at block 802, where the control system receives (scanning) data of a yard from one or more LIDAR sensors (e.g., LIDAR sensors 110). In one embodiment, the control system may generate (or update) a virtual representation (e.g., point cloud data) of the yard, based on the scanning data. At block 804, the control system identifies one or more assets in the yard, based on the scanning data. At block 806, the control system determines a position of each asset in the yard, based on the scanning data. At block 808, the control system transmits an indication of the position(s).

Figure 9A:
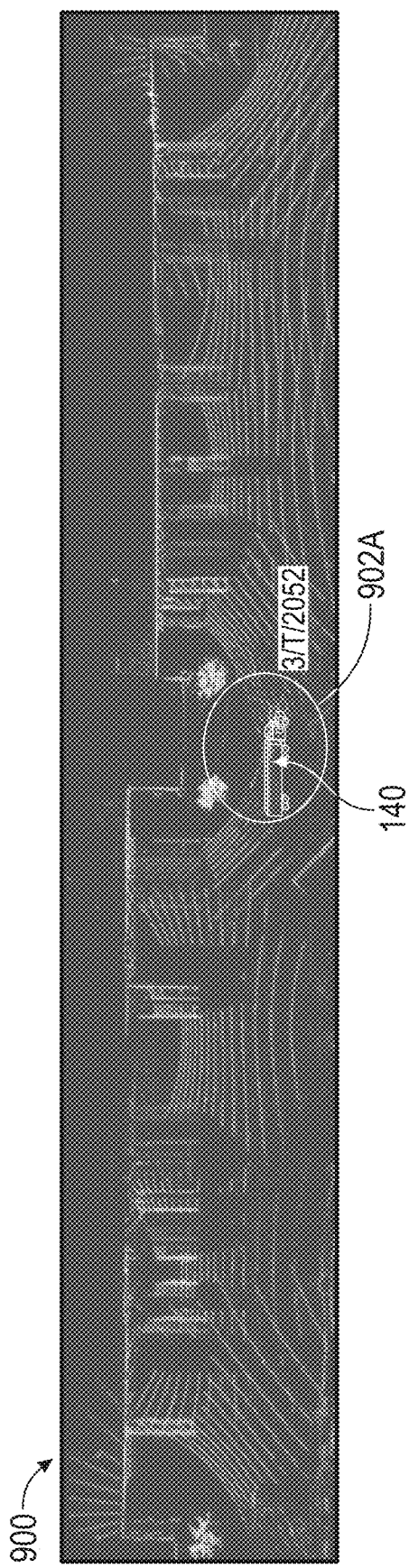
Figure 9B:
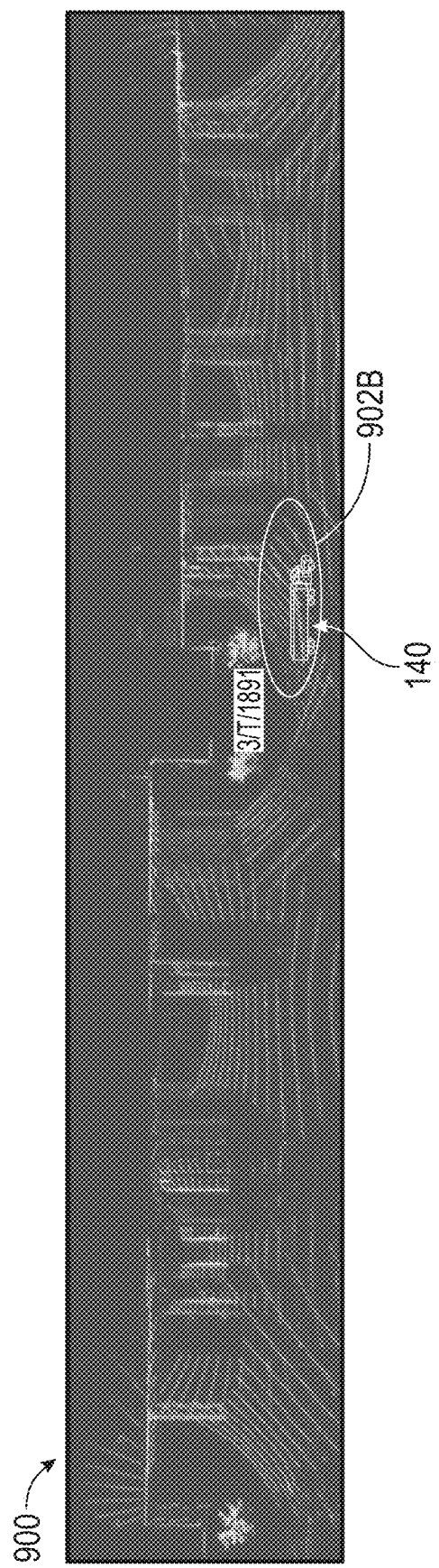

In one embodiment, the control system may transmit the indication of the position(s) to another computing system (e.g., computing system 208) for display on a user interface (e.g., user interface 218). The position of the asset may be updated in real-time on the user interface. As shown in FIG. 9A, for example, the virtual representation 900 depicts the asset 140 at a first position 902A within the yard 906. Subsequently, as shown in FIG. 9B, the virtual representation 900 depicts the asset 140 at a second position 902B within the yard 906. Subsequently, as shown in FIG. 9C, the virtual representation 900 depicts the asset 140 at a third position 902C. Note, for the sake of clarity, FIGS. 9A-9C depict tracking of a single asset 140. Note, however, that the control system can track multiple assets 140 within the yard.

In some embodiments, the control system 104 can detect instances of coupling and/or decoupling in the yard. In one example, a coupling instance between two assets 140 may occur when a first asset 140 (e.g., hostler) attaches to a second asset 140 (e.g., trailer) in order to transport the trailer. In another example, a decoupling instance between two assets 140 may occur when a first asset 140 (e.g., hostler) attached (or coupled) to a second asset 140 (e.g., trailer) decouples from the second asset 140 (e.g., when parking the trailer in a yard slip). In one embodiment, the control system 104 can automatically detect coupling and decoupling and adjust asset IDs for the assets 140.

Figure 10B:
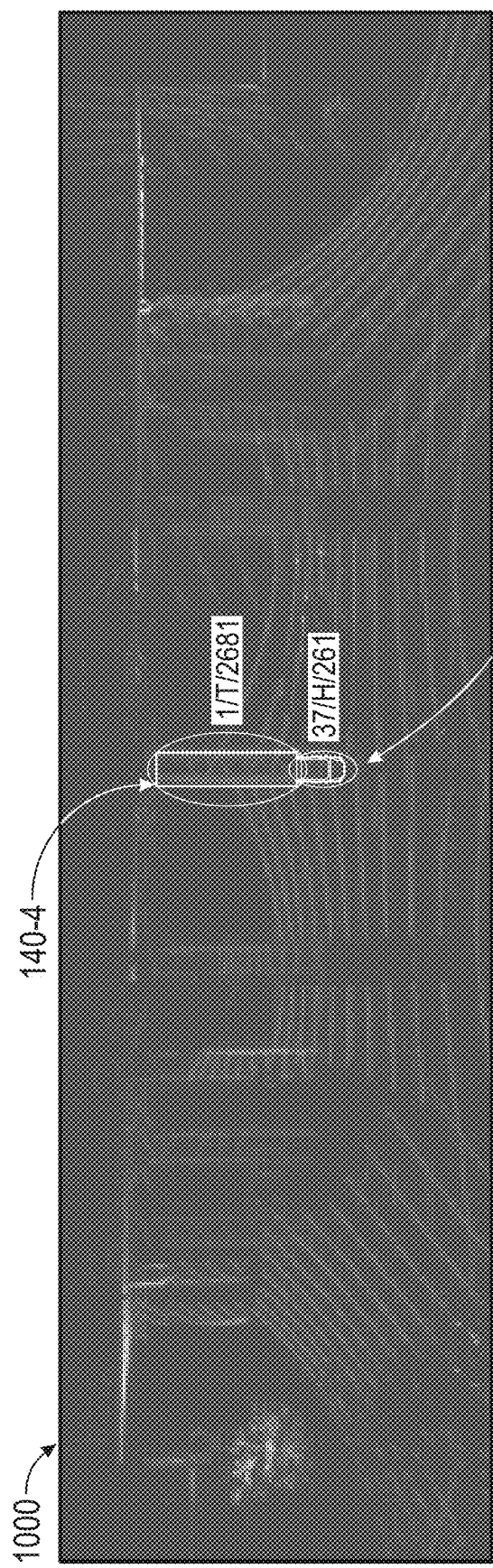

FIGS. 10A-10C depict an example tracking sequence, in which the control system 104 detects decoupling of two assets 140, according to one embodiment. Initially, as shown in the virtual representation 1000 in FIG. 10A, the control system 104 may detect a first asset (e.g., asset 140-3) coupled to a second asset (e.g., asset 140-4). In this particular example, the first asset may be in the process of dropping off (or parking) the second asset at one of the yard slips 108. In this case, the control system 104 uses a single asset ID "1/C/37/2934" to identify the coupled first and second assets, where "1" is the tracking ID for the second asset (e.g., trailer), "C" indicates a coupled type, "37" is the tracking ID for the first asset (e.g., hostler), and "2934" is the number of points.

Subsequently, as shown in the virtual representation 1000 in FIG. 10B, the control system 104 may detect a decoupling of the first asset and the second asset. Once decoupled, the control system 104 can assign separate asset IDs to the decoupled first and second assets. As shown in FIG. 10B, for example, the control system 104 (1) assigns asset ID "1/T/2681" to the second asset, where "1" is the tracking ID for the second asset, "T" indicates a trailer type, and "2681" is the number of points, and (2) assigns asset ID "37/11/261" to the first asset, where "37" is the tracking ID for the first asset, "H" indicates a hostler type, and "261" is the number of points.

Figure 11A:
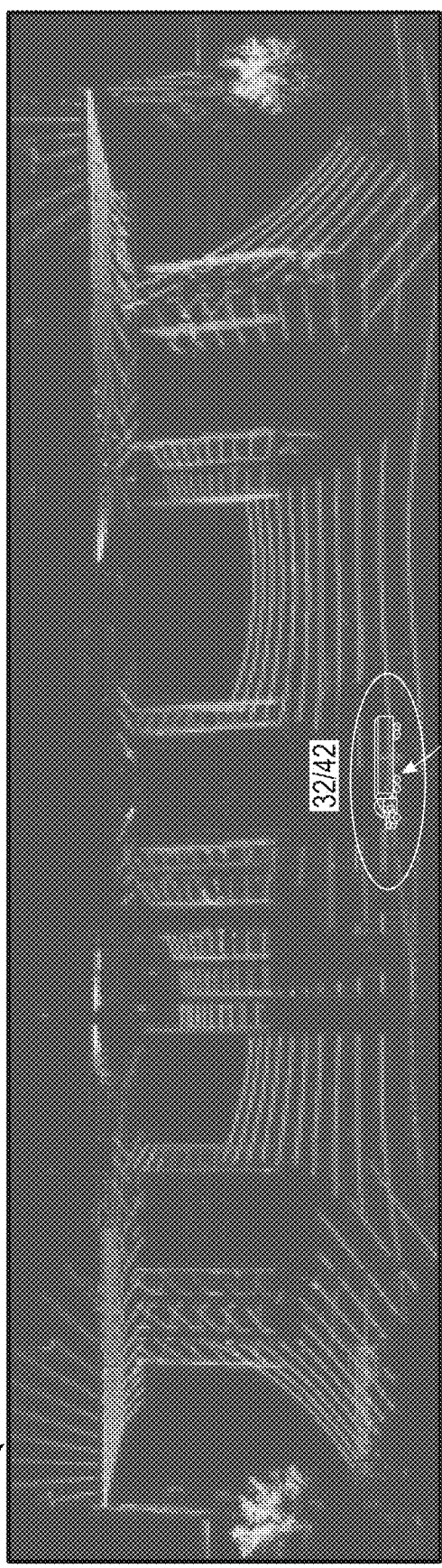
FIGS. 11A-11C depict an example tracking sequence for a scenario in which an asset is occluded from view, according to one embodiment.
Figure 11B:
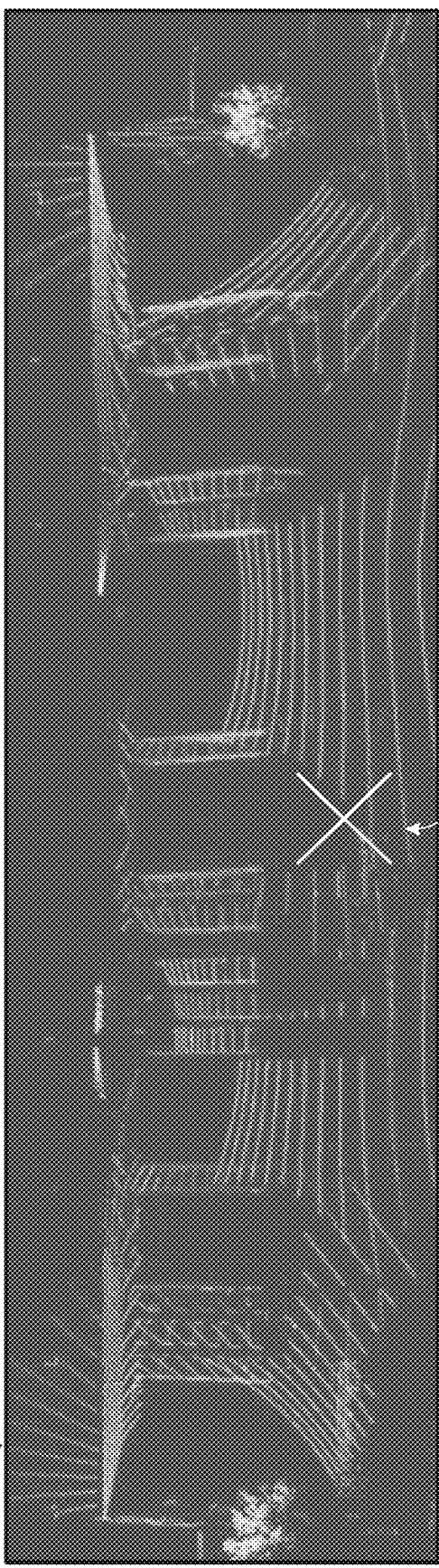
Figure 11C:
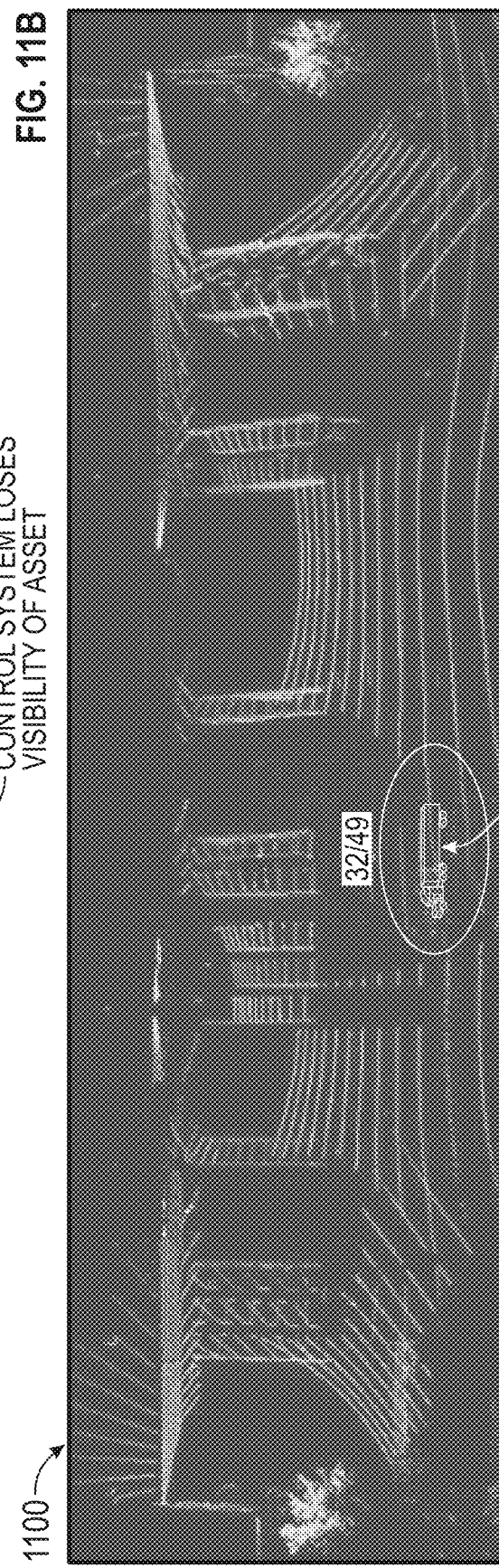

In some situations, the control system 104 may temporarily lose visibility of one or more assets 140 in the yard, e.g., due to network failure, sensor failure, etc. In these situations, once the control system 104 regains visibility, the control system 104 can detect which asset was previously occluded and assign the same previously used asset ID to the occluded asset. FIGS. 11A-11C depict an example tracking sequence, in which the control system 104 tracks an asset 140 after temporarily losing visibility of the asset, according to one embodiment.

Initially, as shown in the virtual representation 1100 in FIG. 11A, the control system 104 may be in the process of tracking an asset 140 (e.g., hostler) with a tracking ID of "32." Subsequently, as shown in the virtual representation 1100 in FIG. 11B, the control system 104 may lose visibility of the asset 140 (e.g., one of the LIDAR sensors may have malfunctioned, there may be a network error, etc.). In this case, as shown in the virtual representation 1100 in FIG. 11C, once the control system 104 regains visibility, the control system 104 is able to detect the asset 140 (e.g., after occlusion) and assign the asset 140 its original tracking ID "32."

Figure 12:
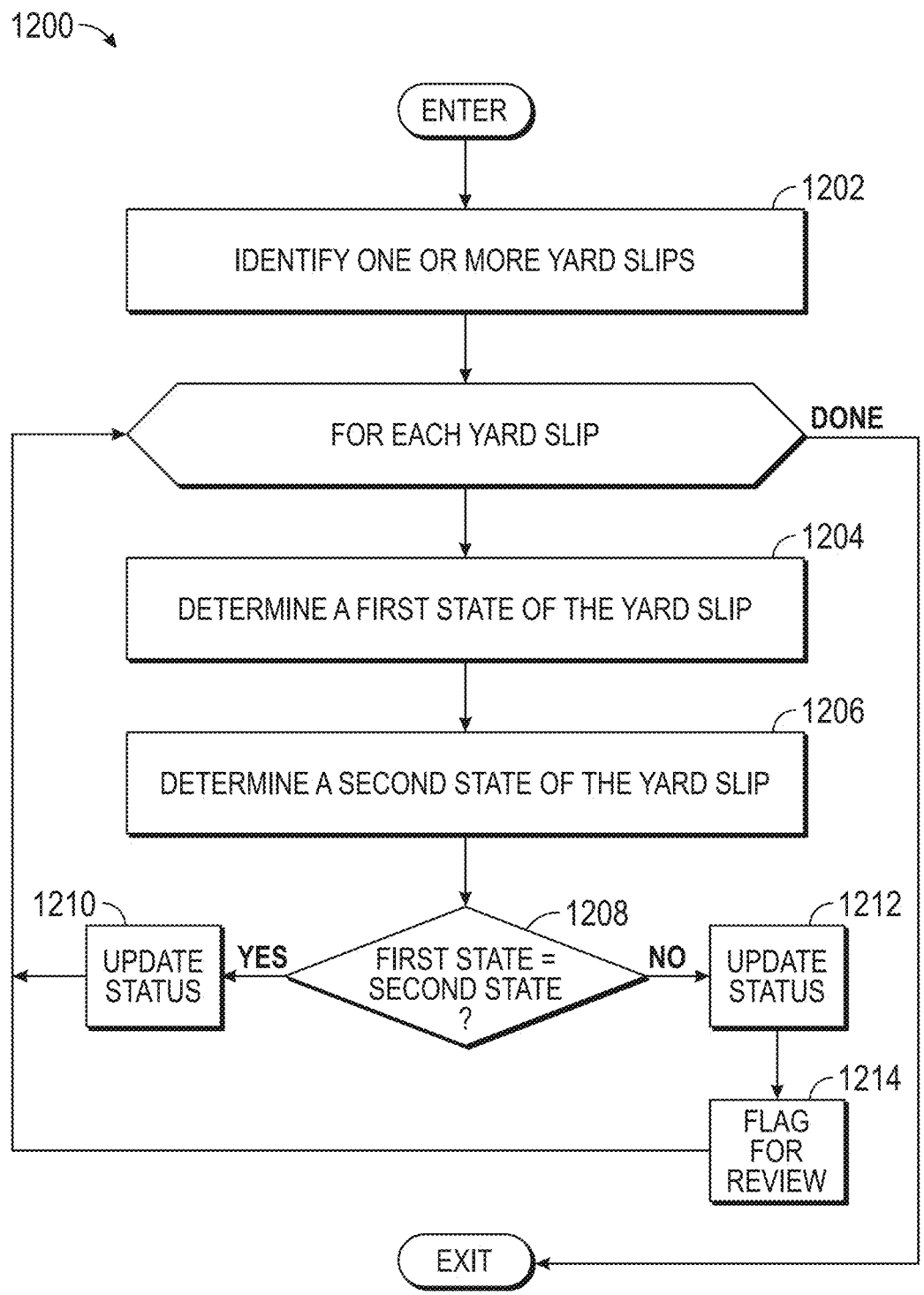
FIG. 12 is a flowchart of a method for conducting a real-time audit of a yard, according to one embodiment.

FIG. 12 is a flowchart of a method 1200 for conducting a real-time audit of a yard (e.g., yard 106), according to one embodiment. The method 1200 may be performed by a control system (e.g., control system 104).

As shown, the method 1200 may enter at block 1202, where the control system identifies one or more yard slips (e.g., yard slips 108). For each yard slip, the control system determines a first state of the yard slip (block 1204) and a second state of the yard slip (block 1206). In one embodiment, the first state may be a physical (observed) state and the second state may be a virtual state maintained by a yard management system (e.g., yard management component 150). For example, determining the first state of the yard slip may include determining whether the yard slip is occupied or unoccupied from the perspective of one or more LIDAR sensors (e.g., LIDAR sensors 110) of the control system, and determining the second state of the yard slip may include determining whether the yard slip is occupied or unoccupied from the perspective of a yard management system. In some embodiments, determining the first and second states may also include determining whether the yard slip is operational or nonoperational.

At block 1208, the control system determines whether the first state matches (or is the same as) the second state. If so, the control system updates the status for the yard slip in the yard management system, e.g., to indicate that the first and second states match (block 1210). If the first and second states do not match, then the control system updates the status for the yard slip in the yard management system, e.g., to indicate that the first and second states do not match (block 1212). The control system may also flag the yard slip for review (block 1214). In one embodiment, the control system may generate and transmit an electronic notification (e.g., to a user, such as a yard associate) indicating that the yard slip needs review. In one embodiment, the control system may modify the virtual representation of the yard, e.g., on a user interface of a user device, to indicate that the yard slip needs review. For example, the control system may highlight the parking slip that needs review on the virtual representation. The control system may perform at least blocks 1204, 1206, 1208 for each yard slip in the yard. Once each yard slip is evaluated, the method 1200 may exit. In one embodiment, after evaluating each yard slip, the control system may transmit an indication of the status of each yard slip to a computing device (e.g., computing system 208) for display on a user interface (e.g., user interface 218) of the computing device.

Figure 13:
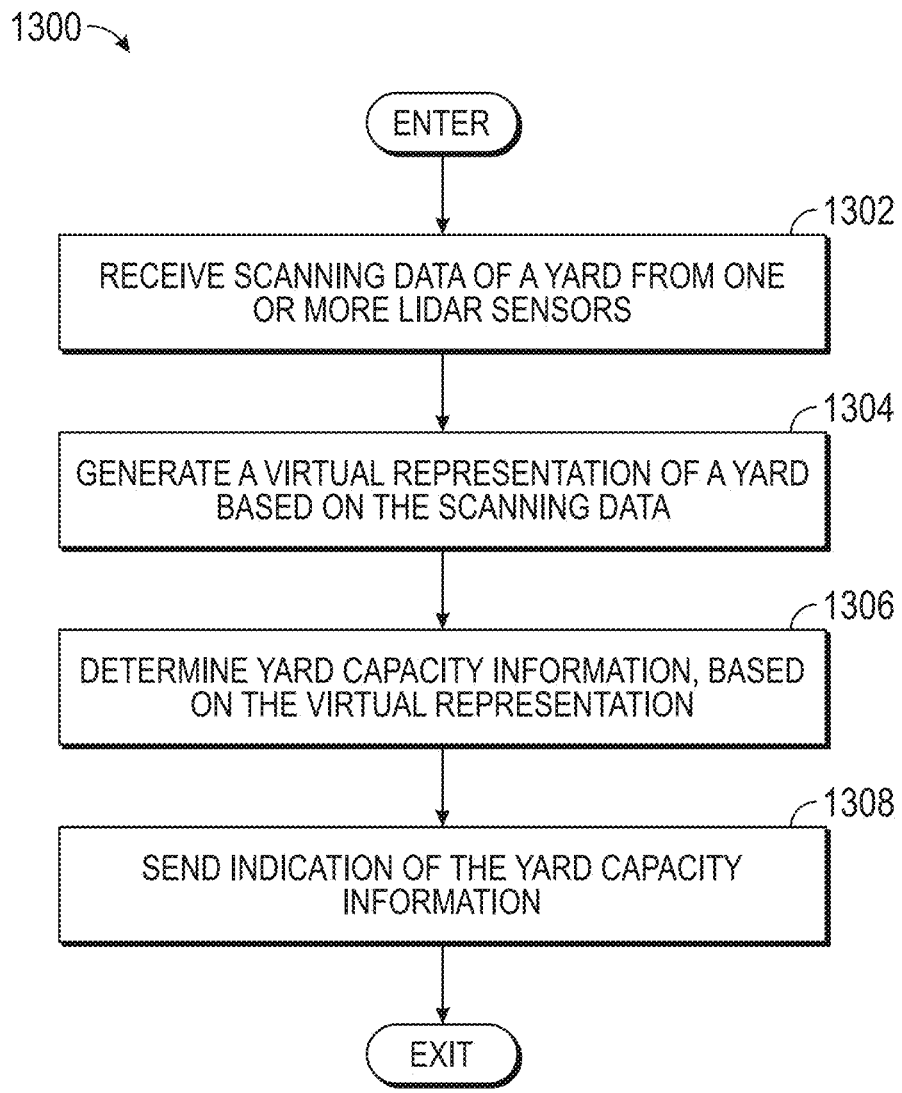
FIG. 13 is a flowchart of a method for generating yard capacity information, according to one embodiment.

FIG. 13 is a flowchart of a method 1300 for generating yard capacity information, according to one embodiment. The method 1300 may be performed by a control system (e.g., control system 104).

As shown, the method 1300 may enter at block 1302, where the control system receives scanning data of a yard (e.g., yard 106) from one or more LIDAR sensors (e.g., LIDAR sensors 110). At block 1304, the control system generates a virtual representation of the yard, based on the scanning data. As noted, in one embodiment, the virtual representation may be in the form of a point cloud. At block 1306, the control system determines yard capacity information, based on the virtual representation. At block 1308, the control system sends an indication of the yard capacity information to a computing device (e.g., computing system 208) for display on a user interface (e.g., user interface 218) of the computing device.

The yard capacity information may include may include, but is not limited to, the number of occupied yard slips, the number of unoccupied yard slips, the number of assets waiting to check into the yard, the number of assets waiting to check out from the yard, the total number of yard slips, the amount of time (e.g., dwell time) an asset is in a given area (or zone) of the yard, the number of operational yard slips, the number of nonoperational yard slips (e.g., yard slip is undergoing maintenance), the fulfillment yard utilization (e.g., percentage of yard slips being utilized), and the like. In some embodiments, if the control system determines that a given asset is within a zone of the yard for a predetermined amount of time (e.g., above a threshold), the control system may generate and transmit an electronic notification to trigger a review of that asset.

In one embodiment, the control system may perform method 1300 in order to determine and provide yard capacity information to a user in real-time. For example, the control system may perform method 1300 at each predetermined time period of multiple time periods within a time window (e.g., 8 hours, 12 hours, 24 hours, etc.). The time periods and/or the time window may be preconfigured by a user (e.g., yard associate).

FIG. 14 depicts an example of information from a real-time audit 1400 that can be provided on a user interface (e.g., user interface 218) of a computing device (e.g., computing system 208), according to one embodiment. In this particular embodiment, the real-time audit 1400 includes facility selection panel 1402, a yard statistics panel 1404, a yard utilization panel 1422, and an audit panel 1432.

The facility selection panel 1402 enables a user to select a given facility (from multiple facilities) and perform a real-time audit of the selected facility. The yard statistics panel 1404 includes information such as the total number of slips 1406 (e.g., 169), the number of matches 1408 (e.g., 115), the number of mismatches 1412 (e.g., 35), the number of unknowns 1414 (e.g., 0), and the number of excluded slips 1416 (e.g., 19).

The yard utilization panel 1422 indicates the percentage utilization of slips within the yard. In this example, the yard utilization (e.g., 79%) is determined based on the number of slips being utilized (e.g., 119) out of the total number of slips in operation (e.g., 150). The total number of slips in operation may be determined based on the total number of slips 1406 (e.g., 169) minus the number of excluded slips 1416 (e.g., 19).

The audit panel 1432 includes an action tag 1410, a location tag 1420, a status tag 1430, an observed state tag 1440, a virtual state tag 1450, an observed last update time tag 1460, and a virtual last update time tag 1470. In FIG. 14, audit information is shown for 11 yard slips out of 169 total slips. In one embodiment, the action tag 1410 may enable a user to change an operational state of a given yard slip location. Here, for example, slips IDs 01-06 are excluded from operation and slip IDs 07-11 are operational. The location tag 1420 indicates the slip ID (e.g., slip ID 234) of the yard slips. The observed last update time tag 1460 indicates the last time (e.g., date and time) the observed state tag 1440 was updated and the virtual last update time tag 1470 indicates the last time (e.g., date and time) the virtual state tag 1450 was updated.

The status tag 1430 indicates a status (e.g., excluded, match, or mismatch) of a given yard slip. Here, for example, slip IDs 01-06 have an "excluded" state, slip IDs 07-08 and 10-11 have a "matched" state, and slip ID 09 has a "mismatched" state. In one embodiment, the status of a yard slip location may be determined based on the observed state tag 1440 and the virtual state tag 1450 for the yard slip location. For example, slip IDs 07-08 and 10-11 have a "matched" state because the observed state and the virtual state for each of these slip IDs match. Likewise, slip ID 09 has an "unmatched" state because the observed state and the virtual state for the yard slip location do not match.

As noted, in some cases, the control system may assign (or divide) a yard (e.g., yard 106) into multiple zones, and each zone may be associated with a particular amount of dwell time. In one embodiment, the dwell time for a given zone may be a maximum amount of time that an asset (that is currently moving) should be located in that zone. If the control system determines that an asset moving within the yard is within a zone for an amount greater than that the dwell time for that zone, the control system may determine that a yard incident involving the asset has occurred. For example, the asset may have malfunctioned, the asset may have collided with another asset, etc. In such cases, the control system can generate and transmit an electronic notification to trigger a review of that asset.

Figure 15:
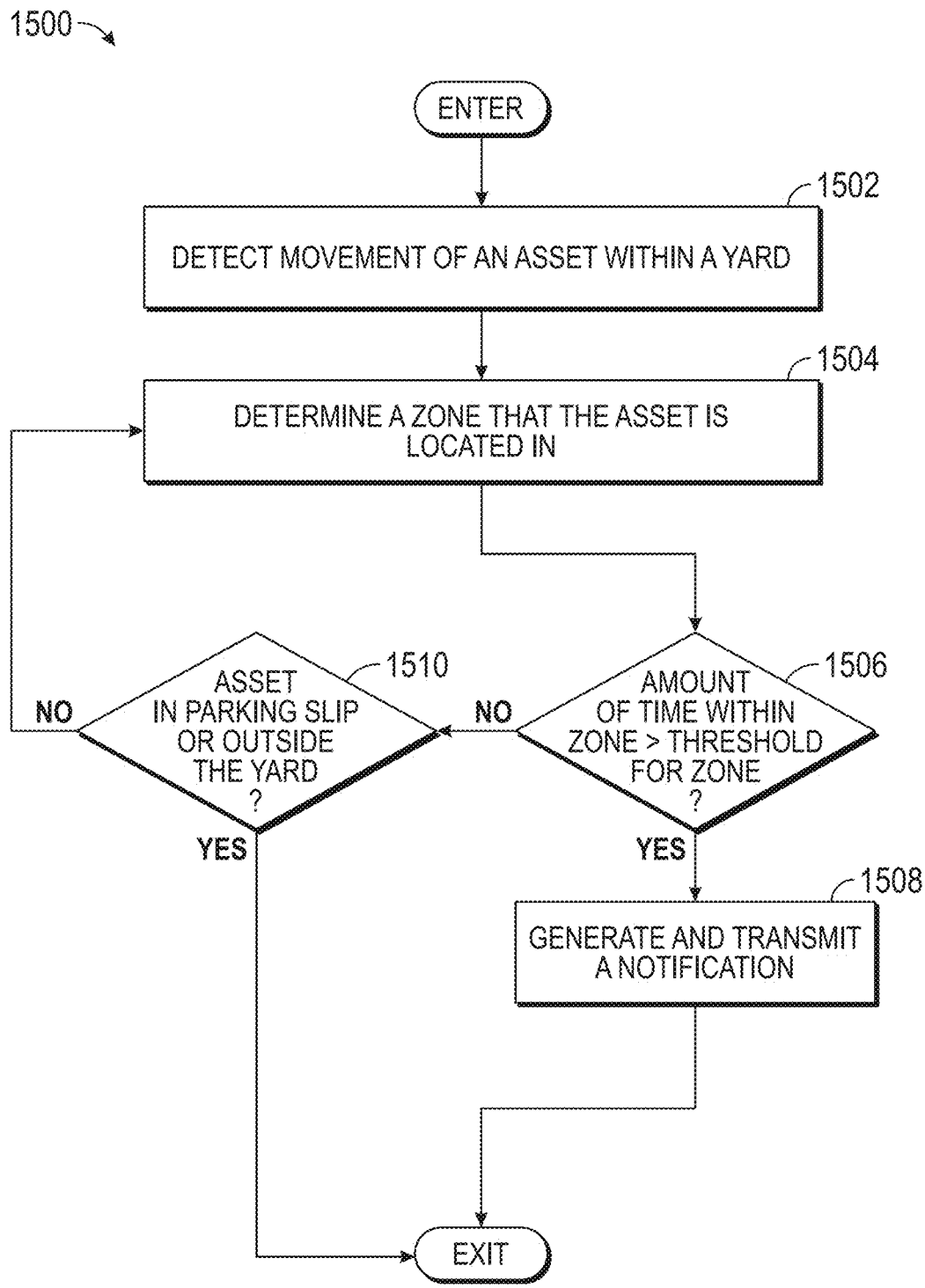
FIG. 15 is a flowchart of a method for detecting a yard incident, according to one embodiment.

FIG. 15 is a flowchart of a method 1500 for detecting yard incidents (e.g., malfunctioning assets) within a yard, according to one embodiment. The method 1500 may be performed by a control system (e.g., control system 104).

The method 1500 may enter at block 1502, where the control system detects movement of an asset within the yard. For example, the asset may not be located in one of the parking slips within the yard. In one embodiment, the asset may be inbound to one of the parking slips, outbound to the exit of the yard, or otherwise in transit within the yard. At block 1504, the control system determines a zone that the asset is located in. For example, the yard may be partitioned into multiple zones and each zone may be associated with a different dwell time. At block 1506, the control system determines whether the amount of time within the zone is greater than the threshold amount of time (e.g., dwell time) associated with the zone. If so, the control system generates and transmits an electronic notification (block 1508). If not, the control system determines whether the asset is in a yard slip or outside the yard (block 1510). If the asset is still in transit within the yard (e.g., not in a yard slip and not outside the yard), the control system proceeds to block 1504. On the other hand, if the asset is outside the yard or in one of the yard slips, the method 1500 exits.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., yard management component 150, yard audit component 160) or related data available in the cloud. For example, the yard management component 150 and/or the yard audit component 160 could execute on a computing system in the cloud and enable a user (e.g., yard associate) to manage one or more operations in a yard. In such a case, the yard management component 150 could store information regarding operations in the yard at a storage location in the cloud. Similarly, the yard audit component 160 can store a real-time status of yard slips in the yard at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. An automated yard audit system, comprising:
a plurality of light detection and ranging (LIDAR) sensors disposed on a facility adjacent to a fulfillment yard of the facility and configured to scan the fulfillment yard; and
a controller coupled to the plurality of LIDAR sensors and configured to:
receive scanning data of the fulfillment yard from each of the one or more LIDAR sensors;
generate a virtual representation of the fulfillment yard from the scanning data received from each of the one or more LIDAR sensors; and
perform an audit of the fulfillment yard, based on the virtual representation, comprising:
identifying, from the virtual representation, a plurality of slip locations in the fulfillment yard; and
for each of the plurality of slip locations:
determining a first state of the slip location, comprising determining the slip location is occupied or unoccupied, based on the virtual representation;
determining a second state of the slip location, comprising determining the slip location is occupied or unoccupied, based on information stored in a computing system; and
determining a status of the slip location based on the first and second states for the slip location.

2. The automated yard audit system of claim 1, wherein the controller is further configured to:
identify, based on the audit, at least one slip location for which the first state is different from the second state; and
transmit an indication of the at least one slip location to another computing system to trigger an in-person review of the at least one slip location.

3. The automated yard audit system of claim 1, wherein the controller is further configured to:
identify, based on the audit, at least one slip location for which the first state is the same as the second state; and
transmit an indication that an in-person review of the at least one slip location is not needed.

4. The automated yard audit system of claim 1, wherein the virtual representation of the fulfillment yard comprises point cloud data from each of the one or more LIDAR sensors.

5. A system, comprising:
a light detection and ranging (LIDAR) sensor configured to scan at least a portion of a fulfillment yard;
at least one processor; and
a memory storing one or more applications, which, when executed by the at least one processor, performs an operation comprising:
receiving data of the fulfillment yard from the LIDAR sensor;
generating a virtual representation of the fulfillment yard, based on the data received from the LIDAR sensor;
identifying one or more objects in the fulfillment yard, based on the virtual representation;
tracking movement of the one or more objects in the fulfillment yard;
transmitting information associated with the virtual representation of the fulfillment yard to a computing system; and
updating a position of at least one of the one or more objects in the virtual representation while tracking movement of the one or more objects in the fulfillment yard.

6. The system of claim 5, further comprising a sensor disposed at a location of the fulfillment yard and configured to identify a type of the one or more objects at the location.

7. The system of claim 6, the operation further comprising assigning an identifier to one or more of the objects at the location, based at least in part on the respective type of the object.

8. The system of claim 5, wherein tracking the movement of the one or more objects comprises:
determining, at a first time instance, that a first object is coupled to a second object in the fulfillment yard, wherein a single identifier is assigned to the coupled first and second objects at the first time instance; and
determining, at a second time instance, that the first object is decoupled from the second object in the fulfillment yard, wherein separate identifiers are assigned to the first and second objects at the second time instance.

9. The system of claim 5, wherein the virtual representation comprises point cloud data from the LIDAR sensor.

10. The system of claim 5, wherein the LIDAR sensor is disposed on a facility adjacent to the fulfillment yard.

11. The system of claim 5, wherein the LIDAR sensor is disposed in a stationary location.

12. The system of claim 11, wherein the stationary location of the LIDAR sensor is based on an initial map of the fulfillment yard.

13. The system of claim 5, wherein:
the fulfillment yard comprises a plurality of virtual zones; and
tracking the movement of the one or more objects comprises:
identifying at least a first object located in a first of the virtual zones; and
determining an amount of time that the first object is located in the first of the virtual zones.

14. The system of claim 13, the operation further comprising triggering an alert if the amount of time is above a predetermined threshold amount of time associated with the first of the virtual zones.

15. A computer-implemented method, comprising:
receiving sensor data from a light detection and ranging (LIDAR) sensor configured to scan at least a portion of a fulfillment yard, wherein the LIDAR sensor is disposed on a facility associated with the fulfillment yard; and
performing an audit of the fulfillment yard, based on the sensor data, wherein performing the audit of the fulfillment yard comprises:
identifying, from the sensor data, a plurality of slip locations in the fulfillment yard; and
for each of the plurality of slip locations:
determining a first state of the slip location, based on the sensor data;
determining a second state of the slip location, based on information stored in a computing system; and
determining a status of the slip location based on the first and second states for the slip location.

16. The computer-implemented method of claim 15, further comprising:
determining, based on the audit, a current capacity of the fulfillment yard, wherein the current capacity is based on a number of slip locations being utilized out of a total number of operational slip locations; and
transmitting an indication of the current capacity to a computing system.

17. The computer-implemented method of claim 15, further comprising:
receiving sensor data from a device disposed at a location of the fulfillment yard;
determining, based on the sensor data from the device disposed at the location, at least one of: (i) a number of objects waiting to check into the fulfillment yard and (ii) a number of objects waiting to check out from the fulfillment yard; and
transmitting an indication of at least one of: (i) the number of objects waiting to check into the fulfillment yard and (ii) the number of objects waiting to check out from the fulfillment yard to a computing system.

18. The computer-implemented method of claim 15, further comprising:
identifying, based on the audit, at least one slip location for which the first state is the same as the second state; and
transmitting an indication that an in-person review of the at least one slip location is not needed.

19. The computer-implemented method of claim 15, further comprising:
identifying, based on the audit, at least one slip location for which the first state is different from the second state; and
transmitting an indication of the at least one slip location to trigger an in-person review of the at least one slip location.

20. The computer-implemented method of claim 15, wherein the fulfillment yard is located within the facility.

* * * * *